United States Patent
Yoo et al.

(10) Patent No.: US 10,978,058 B2
(45) Date of Patent: Apr. 13, 2021

(54) ELECTRONIC APPARATUS AND CONTROL METHOD THEREOF

(71) Applicant: SAMSUNG ELECTRONICS CO., LTD., Suwon-si (KR)

(72) Inventors: Jonguk Yoo, Suwon-si (KR); Kihoon Shin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 135 days.

(21) Appl. No.: 16/207,483

(22) Filed: Dec. 3, 2018

(65) Prior Publication Data

US 2019/0172451 A1  Jun. 6, 2019

(30) Foreign Application Priority Data

Dec. 4, 2017 (KR) .................. 10-2017-0165426

(51) Int. Cl.
*G10L 15/22* (2006.01)
*G10L 15/20* (2006.01)
(Continued)

(52) U.S. Cl.
CPC ............ *G10L 15/20* (2013.01); *G06F 1/3265* (2013.01); *G10L 15/28* (2013.01); *G10L 25/84* (2013.01);
(Continued)

(58) Field of Classification Search
CPC ......... G10L 15/20; G10L 15/28; G10L 15/22; G10L 21/02; G10L 25/84;
(Continued)

(56) References Cited

U.S. PATENT DOCUMENTS

| 6,859,773 B2 | 2/2005 | Breton |
| 7,103,542 B2 | 9/2006 | Doyle |

(Continued)

FOREIGN PATENT DOCUMENTS

| KR | 10-2008-0056571 | 6/2008 |
| KR | 10-2015-0073441 | 7/2015 |
| KR | 10-1713770 | 3/2017 |

OTHER PUBLICATIONS

Search Report and Written Opinion dated Mar. 19, 2019 in counterpart International Patent Application No. PCT/KR2018/014913.

(Continued)

*Primary Examiner* — Abul K Azad
(74) *Attorney, Agent, or Firm* — Nixon & Vanderhye P.C.

(57) ABSTRACT

Disclosed are an electronic apparatus, a control method thereof, and a computer program product for the same, the electronic apparatus including: a receiver comprising receiving circuitry configured to receive a sound; and a processor configured to: identify with a given sensitivity whether a characteristic of a received sound corresponds to a voice command of a user in response to the sound being received through the receiver, identify the voice command based on identifying that the characteristic of the received sound corresponds to the voice command, and perform an operation corresponding to the identified voice command, and change the sensitivity based on identifying that the characteristic of the received sound does not correspond to the voice command. Thus, the electronic apparatus performs the optimum and/or improved audio process by properly controlling the sensitivity based on the circumstances.

17 Claims, 14 Drawing Sheets

(51) Int. Cl.
  *G10L 15/28* (2013.01)
  *G06F 1/3234* (2019.01)
  *H04N 5/63* (2006.01)
  *H04N 21/422* (2011.01)
  *H04N 5/60* (2006.01)
  *G10L 25/84* (2013.01)
  *G10L 21/02* (2013.01)
  *G10L 25/78* (2013.01)

(52) U.S. Cl.
  CPC ............... *H04N 5/60* (2013.01); *H04N 5/63* (2013.01); *H04N 21/42203* (2013.01); *G10L 15/22* (2013.01); *G10L 21/02* (2013.01); *G10L 2025/786* (2013.01)

(58) Field of Classification Search
  CPC ... G10L 2025/786; G06F 1/3265; H04N 5/60; H04N 5/63; H04N 21/42203
  See application file for complete search history.

(56) References Cited

U.S. PATENT DOCUMENTS

| | | | |
|---|---|---|---|
| 8,990,079 B1 | 3/2015 | Newman | |
| 2014/0278389 A1 | 9/2014 | Zurek et al. | |
| 2015/0081296 A1* | 3/2015 | Lee | G10L 15/20 704/239 |
| 2016/0077794 A1 | 3/2016 | Kim et al. | |
| 2016/0118039 A1* | 4/2016 | Moon | G10L 15/08 704/239 |
| 2016/0267908 A1* | 9/2016 | Borjeson | G10L 25/78 |

OTHER PUBLICATIONS

Extended Search Report dated May 10, 2019 in counterpart European Patent Application No. 18209654.5.
European Office Action dated Jan. 20, 2021 for EP Application No. 18209654.5.

* cited by examiner

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2017-0165426 filed on Dec. 4, 2017 in the Korean Intellectual Property Office, the disclosure of which is incorporated by reference herein in its entirety.

BACKGROUND

Field

The present disclosure relates generally to an electronic apparatus and a control method thereof, and, for example, to a display apparatus capable of recognizing a user's voice, a control method thereof, and a computer program product for the same.

Description of Related Art

An electronic apparatus has recently been developed to receive a sound including a voice of a user and noise, remove the noise from the received sound, properly select a command corresponding to the voice with no noise, and perform an operation in response to the command. To receive and process the sound, the electronic apparatus has to properly operate when the user speaks the voice. Therefore, the electronic apparatus is ready to receive a sound including a voice of a user in a standby mode other than an operation mode.

Since the electronic apparatus in the standby mode operates with the minimum resources, it is difficult to execute a process for removing noise from the received sound. Also, before the electronic apparatus processes the received sound, the electronic apparatus in the standby mode cannot determine in advance whether the received sound includes a user's voice or just ambient noise without the voice. To address this problem, when a specific event in the received sound is detected in the standby mode, the electronic apparatus proceeds to remove noise from the received sound to obtain a voice, supposing there is the voice included in the received sound.

In a conventional method generally used in detecting the specific event, the electronic apparatus determines whether a magnitude of a received sound is higher than a preset threshold value, and proceeds to remove noise from the received sound if the magnitude is higher than or equal to the threshold value. However, the electronic apparatus keeps receiving a sound without further proceeding if no events are detected when the magnitude is lower than the threshold value.

However, because the conventional method has a fixed threshold value for detecting the specific event in the received sound, it does not always properly operate under various circumstances in which a level of noise is variant.

Accordingly, there is a need of making the electronic apparatus properly and adaptively react to a user's voice under various noise circumstances even while operating with the minimum resources.

SUMMARY

An example aspect of one or more example embodiments provides an electronic apparatus, in which sensitivity to event detection is controlled to reduce detection of a voice event caused by noise during voice recognition, a control method thereof, and a computer program product for the same.

Another example aspect of one or more example embodiments provides an electronic apparatus, in which resources are efficiently managed controlling sensitivity to event detection, and a control method thereof.

According to an example embodiment, an electronic apparatus is provided, the electronic apparatus including: a receiver comprising receiving circuitry configured to receive a sound; and a processor configured to: based on the sound being received through the receiver, identify with a sensitivity whether a characteristic of the received sound corresponds to a voice command of a user, based on the characteristic of the received sound corresponding to the voice command, identify the voice command and perform an operation corresponding to the identified voice command, and based on the characteristic of the received sound not corresponding to the voice command, change the sensitivity. Thus, the electronic apparatus performs the optimum and/or improved audio process by properly controlling the sensitivity in accordance with the circumstances.

The processor may detect a voice event from the received sound to identify the characteristic of the received sound. Thus, the electronic apparatus performs the optimum and/or improved audio process by properly controlling the sensitivity while using the minimum and/or reduced resources in accordance with the circumstances.

The processor may remove noise from the received sound. Thus, the electronic apparatus enhances precision for the voice recognition.

The processor may identify whether the voice event is detected in accordance with whether a characteristic value of the received sound is higher than a threshold value, and adjust the threshold value to change the sensitivity. Thus, the electronic apparatus may control the sensitivity to be suitable for the circumstances, thereby optimizing and/or improving a balance of resources.

The processor may lower the sensitivity when a frequency of identifying that the characteristic of the received sound does not correspond to the voice command being higher than a predetermined value. Thus, the electronic apparatus controls the sensitivity suitable for the circumstances, thereby optimizing and/or improving the balance of the resources.

The processor may selectively use at least one of a plurality of detection algorithms, each algorithm being different in precision, in detecting the voice event to change the sensitivity. Thus, the electronic apparatus uses a proper algorithm according to the circumstances, thereby optimizing and/or improving the balance of the resources.

The plurality of detection algorithms may include at least one of a time-domain detection algorithm and a frequency-domain detection algorithm. Thus, the electronic apparatus uses a proper algorithm according to the circumstances, thereby optimizing and/or improving the balance of the resources.

The processor may be further configured to: based on the characteristic of the received sound corresponding to the voice command, identify whether the voice command in the received sound is recognized, and based on the voice command in the received sound not being recognized, change the sensitivity. Thus, the electronic apparatus applies the optimum audio process to a user's sound while using the minimum and/or reduced resources optimized and/or improved to the circumstances.

The processor may raise the sensitivity when a frequency of identifying that the voice command in the received sound is not recognized being higher than a predetermined value. Thus, the electronic apparatus applies the optimum and/or improved audio process to a user's sound while using the minimum and/or reduced resources optimized to the circumstances.

According to an example embodiment, a method of controlling an electronic apparatus is provided, the method including: based on a sound being received, identifying with a sensitivity whether a characteristic of the received sound corresponds to a voice command of a user; based on the characteristic of the received sound corresponding to the voice command, identifying the voice command and performing an operation corresponding to the identified voice command, and based on the characteristic of the received sound not corresponding to the voice command, changing the sensitivity. Thus, the electronic apparatus performs the optimum and/or improved audio process by properly controlling the sensitivity in accordance with the circumstances.

The method may further include detecting a voice event from the received sound to identify the characteristic of the received sound. Thus, the electronic apparatus performs the optimum and/or improved audio process by properly controlling the sensitivity while using the minimum resources in accordance with the circumstances.

The method may further include removing noise from the received sound. Thus, the electronic apparatus enhances precision for the voice recognition.

The changing of the sensitivity may include identifying whether the voice event is detected in accordance with whether a characteristic value of the received sound is higher than a threshold value; and adjusting the threshold value to change the sensitivity. Thus, the electronic apparatus controls the sensitivity suitable for the circumstances, thereby optimizing and/or improving a balance of resources.

The changing of the sensitivity may include lowering the sensitivity when a frequency of identifying that the characteristic of the received sound does not correspond to the voice command being higher than a predetermined value. Thus, the electronic apparatus controls the sensitivity suitable for the circumstances, thereby optimizing and/or improving a balance of resources.

The changing of the sensitivity may further include selectively using at least one of a plurality of detection algorithms, each algorithm being different in precision, in detecting the voice event. Thus, the electronic apparatus uses a proper algorithm according to the circumstances, thereby optimizing and/or improving the balance of the resources.

The plurality of detection algorithms may include at least one of a time-domain detection algorithm and a frequency-domain detection algorithm. Thus, the electronic apparatus uses a proper algorithm according to the circumstances, thereby optimizing and/or improving the balance of the resources.

The method may further include: based on the characteristic of the received sound corresponding to the voice command, identifying whether the voice command in the received sound is recognized, and based on identifying that the voice command in the received sound is not recognized, changing the sensitivity. Thus, the electronic apparatus applies the optimum and/or improved audio process to a user's sound while using the minimum and/or reduced resources optimized and/or improved to the circumstances.

The changing of the sensitivity may further include raising the sensitivity when a frequency of identifying that the voice command in the received sound is not recognized being higher than a predetermined value. Thus, the electronic apparatus applies the optimum and/or improved audio process to a user's sound while using the minimum and/or reduced resources optimized and/or improved to the circumstances.

According to an example embodiment, a computer program product is provided, the computer program product including: a memory configured to store at least one instruction; and a processor configured to execute the at least one instruction to: based on the sound being received through the receiver, identify with a sensitivity whether a characteristic of the received sound corresponds to a voice command of a user, based on the characteristic of the received sound corresponding to the voice command, identify the voice command and perform an operation corresponding to the identified voice command, and based on the characteristic of the received sound not corresponding to the voice command, change the sensitivity. Thus, the electronic apparatus performs the optimum and/or improved audio process by properly controlling the sensitivity in accordance with the circumstances.

BRIEF DESCRIPTION OF THE DRAWINGS

The above and/or the aspects, features and attendant advantages of the present disclosure will become more apparent and more readily appreciated from the following detailed description, taken in conjunction with the accompanying drawings, in which like reference numerals refer to like elements, and wherein.

DETAILED DESCRIPTION

Figure 1:
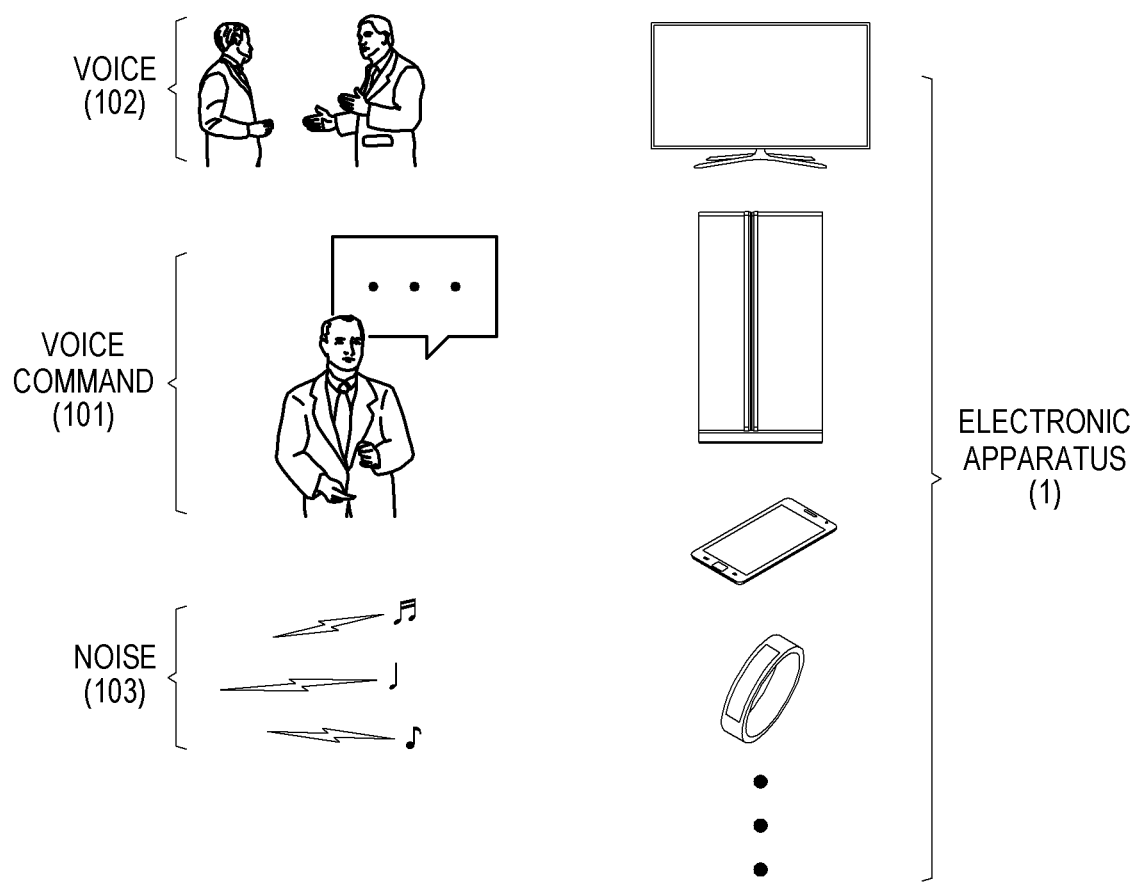
FIG. 1 is a diagram illustrating an example electronic apparatus according to an example embodiment.

Below, various example embodiments will be described in greater detail with reference to accompanying drawings.

In the drawings, like numerals or symbols refer to like elements having substantially the same function, and the size of each element may be exaggerated for clarity and convenience of description. However, the configurations and functions illustrated in the following example embodiments are not to be construed as limiting the present disclosure and the key configurations and functions. In the following descriptions, details about publicly known functions or features may be omitted if it is determined that they cloud the gist of the present disclosure.

In the following example embodiments, terms 'first', 'second', etc. are used to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or any combination of hardware and software, and be modularized into at least one processor.

FIG. 1 is a diagram illustrating an example electronic apparatus according to an example embodiment. The electronic apparatus 1 according to an example embodiment may for example, and without limitation, be realized by a television (TV), a refrigerator, a smartphone, a wearable device such as a smartwatch, a vehicle, or the like apparatus capable of recognizing a speech. However, the electronic apparatus 1 according to an example embodiment may, for example, and without limitation, be realized by any apparatus as long as it can recognize a voice of a user's speech.

The electronic apparatus 1 according to an example embodiment receives a sound including a voice of a user's speech, and a sound within a frequency band of the voice that a user can make. As shown in FIG. 1, the electronic apparatus 1 receives a sound that may include a voice of a user who intends to control the electronic apparatus 1 involving his/her voice command 101, a voice 102 of someone else except the user, and/or noise 103. The electronic apparatus 1 may more effectively identify the voice command 101 in the received sound under various noise circumstances with less resources being used. The electronic apparatus 1 uses more resources for voice recognition with higher precision, or fewer resources for voice recognition with lower precision. Therefore, the electronic apparatus 1 may keep the precision high while using the minimum and/or reduced resources.

Below, the electronic apparatus 1 capable of adjusting sensitivity and adaptively reacting to a user's voice command 101 while using the minimum and/or reduced resources will be described.

Figure 2:
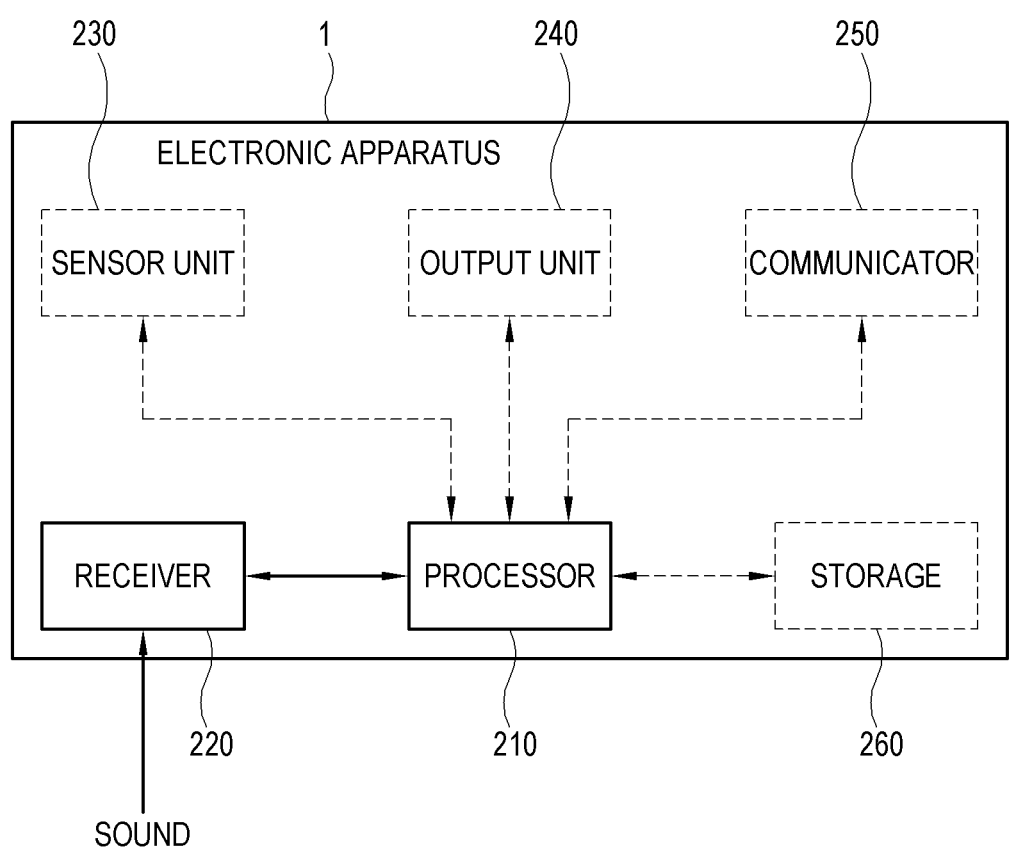
FIG. 2 is a block diagram illustrating an example electronic apparatus according to an example embodiment.

FIG. 2 is a block diagram illustrating an example electronic apparatus according to an example embodiment. The electronic apparatus 1 according to an example embodiment includes a processor (e.g., including processing circuitry) 210 and a receiver (e.g., including receiving circuitry) 220. The electronic apparatus 1 may further include a sensor unit (e.g., including at least one sensor) 230, an output unit (e.g., including output circuitry) 240, a communicator (e.g., including communication circuitry) 250, a storage 260, etc. in addition to the processor 210 and the receiver 220. However, FIG. 2 merely illustrates an example of the elements in the electronic apparatus 1 according to an example embodiment. The electronic apparatus 1 according to an example embodiment may include elements other than the elements shown in FIG. 2. That is, the electronic apparatus 1 according to an example embodiment may include another element in addition to the elements shown in FIG. 2, or exclude a certain element from the elements shown in FIG. 2.

The receiver 220 may include various receiving circuitry and receives a sound. The receiver 220 converts an analog signal corresponding to a received sound into a digital signal, transmits the converted digital signal to the processor 210, so that a voice recognition module (e.g., including processing circuitry and/or program elements) can recognize a voice command. To receive a sound wave of a human voice, the receiver 220 may include various receiving circuitry, such as, for example, and without limitation, a microphone (Mic), or the like. The microphone may receive a sound corresponding to all of voices a human can make. Besides such voices, the microphone may receive all sounds that a human can hear and recognize.

The electronic apparatus 1 may indirectly receive a sound from a mobile device (not shown) or the like device. For example, a sound may be received from the microphone provided in the mobile device (not shown) such as a remote controller (not shown), a smartphone, or the like for communicating with the electronic apparatus 1, and then transmitted to the electronic apparatus 1. In this case, the mobile device such as the smartphone, etc., may for example be installed with a remote-control application (App), and the remote-control App may be executed so that a sound corresponding to a voice for controlling the operation of the electronic apparatus 1 can be transmitted to the electronic apparatus 1. The remote controller or the mobile device converts an analog signal corresponding to the sound received through the microphone into a digital signal, and transmits the converted digital signal to the electronic apparatus 1.

The processor 210 may include various processing circuitry and performs voice recognition on the sound received from the remote controller or the mobile device. When the electronic apparatus 1 indirectly receives the sound, a communication method between the electronic apparatus 1 and the mobile device may be the same as or different from a communication method between the electronic apparatus 1 and an external server (not shown). For example, the electronic apparatus 1 may use Wi-Fi for communication with the mobile device and the external server, Bluetooth for communication with the receiver, and Ethernet for communication with the external server. The electronic apparatus 1 may further include the sensor unit 230.

The sensor unit 230 may include at least one of various sensors and employs various sensors to sense surrounding circumstances and sends the sensed circumstances to the processor 210. The sensors of the sensor unit 230 may include, for example, and without limitation, an infrared sensor, an image sensor, or the like to sense external circumstances of the electronic apparatus 1, and transmit other sensed signals as well as a visual stimulus to the processor 210. For example, the sensor unit 230 may include, for example, and without limitation, an image sensor for sensing a user's position or a user's motion, a motion sensor for sensing vibration, a position sensor for sensing a position, an illuminometer for measuring brightness, a color sensor for sensing color, or the like. The illuminometer or the color sensor may also sense a user's motion. The sensors of the sensor unit 230 provided in the electronic apparatus 1 may further include other sensors without limitations. Further, the electronic apparatus 1 may receive data about various stimuli from an external sensor device and use the received data as circumstantial information.

The electronic apparatus 1 may further include the output unit 240. The output unit 240 may include various output circuitry. Under control of the processor 210, the output unit 240 may provide a user information based, for example, and without limitation, on visual, auditory, tactile or the like senses. For example, the output unit 240 may use various output circuitry, such as, for example, and without limitation, a display to output visual information, a loudspeaker to output auditory information, a vibrator to output tactile information, or the like.

The electronic apparatus 1 may further include the communicator 250 including various communication circuitry. Under control of the processor 210, the communicator 250 may communicate with external apparatuses. The communicator 250 may be based on one of various communication methods.

For example, the communicator 250 may, for example, include a connection unit for wired communication, and the connection unit may include various circuitry, such as, for example, and without limitation, to be used in transmitting/receiving a signal/data according to standards such as high definition multimedia interface (HDMI), HDMI-consumer electronics control (CEC), universal serial bus (USB), Component, or the like, and include at least one connector or terminal corresponding to each of the standards. The communicator 250 may include various communication circuitry and perform wired communication with a plurality of servers through a wired local area network (LAN). The communicator 250 may be configured to include a radio frequency (RF) circuit for transmitting/receiving an RF signal to perform wireless communication with the external apparatuses, or use at least one communication method among various communication methods such as Bluetooth, Wi-Fi, Zigbee, ultra-wide band (UWB), a wireless USB, and near field communication (NFC).

The electronic apparatus 1 may process a signal of a sound received through the receiver 220 or the communicator 250 and carry out a voice command included in the received sound, or may transmit the sound to the external server (not shown). Hereinafter, for the purpose of description, "process (or transmit, etc.) a signal of a sound" may be simply represented as "process (or transmit, etc.) a sound."

The external server may process and convert the received sound into a voice command. The external server may perform speech-to-text conversion for converting a voice included in the sound into a text, and recognize a voice command from the text. The external server may be one or more servers to perform the speech-to-text conversion and the voice command recognition.

The electronic apparatus 1 may autonomously receive and process a sound and carry out an operation. The electronic apparatus 1 may transmit a sound to a server and receive a voice command corresponding to the sound from the server.

The electronic apparatus 1 may transmit a sound to a server, receive a converted text from the server, and carry out a voice command corresponding to the converted text.

The electronic apparatus 1 may convert a sound into a text, transmit the converted text to a server, receive a voice command corresponding to the text, and carry out a voice command corresponding to the text.

The electronic apparatus 1 may transmit a sound to a first server; the first server may convert the received sound into a text and transmit the converted text to a second server; and the second server may transmit a voice command corresponding to the received text to the electronic apparatus 1. The second server may transmit the voice command corresponding to the received text to the first server, and the first server may transmit the received voice command to the electronic apparatus 1. However, there are no limits to a relationship between the electronic apparatus 1 and the external server.

The processor 210 may cause information about a function of the electronic apparatus 1 corresponding to a voice command, and information about a result of voice recognition in the external server to be stored in the storage 260, and then controls the function to be carried out with reference to the stored information when the same voice command is received.

The electronic apparatus 1 may further include the storage 260. Under control of the processor 210, the storage 260 may be configured to store various pieces of information, and information received from the external apparatus.

The processor 210 of the electronic apparatus 1 may include various processing circuitry and perform control for operating general elements of the electronic apparatus 1. The processor 210 may include a control program (e.g., instruction, program element, or the like) for performing such control operations, a nonvolatile memory in which the control program is installed, a volatile memory in which at least a part of the installed control program is loaded, and the processing circuitry may include, for example, and without limitation, at least one processor, central processing unit (CPU), or the like, for executing the loaded control program. Further, the control program may be stored in an electronic apparatus other than the electronic apparatus 1. There may be at least one processor 210. The processor 210 may include two or more processors.

The control program may include a program(s) achieved in the form of, for example, and without limitation, at least one of a basic input/output system (BIOS), a device driver, an operating system, firmware, a platform, and an application program (or an application). According to an example embodiment, the application program may be previously installed or stored in the electronic apparatus 1 when the electronic apparatus 1 is manufactured, or may be installed in the electronic apparatus 1 based on application program data received from the outside when used in the future. The application data may for example be downloaded from an application market and the like external server to the electronic apparatus 1. Such an external server is an example of a computer program product according to an example embodiment, but not limited thereto.

The processor 210 may for example control the receiver 220 to receive a sound. The processor 210 may process the received sound. Further, the processor 210 may control a signal processor (not shown) to process the received sound. In the electronic apparatus 1 shown in FIG. 2, the signal processor and the processor 210 are provided as one element. However, this is merely an example, and the electronic apparatus 1 according to an alternative example embodiment may include the signal processor and the processor 210 which are provided separately from each other.

In the electronic apparatus 1 according to an example embodiment, the receiver 220 may include various receiving circuitry that receives a sound. The processor 210 identifies with a given sensitivity whether a characteristic of the received sound corresponds to a voice command. The sensitivity may, for example, represent how precise determination is made about whether the characteristic of the received sound corresponds to a voice command. For example, when the sensitivity is high, the processor 210 may determine the characteristic of the received sound with relatively high precision. On the other hand, the higher sensitivity needs more resources for the process on the received sound. When the sensitivity is low, the processor 210 may determine the characteristic of the received sound with relatively low precision. The lower sensitivity needs fewer resources for the process on the received sound.

The processor 210 may change the sensitivity, e.g., raises or lowers the sensitivity in accordance with a user's intention or results of voice recognition, thereby performing the sound process optimized and/or improved to the circumstances.

Figure 3:
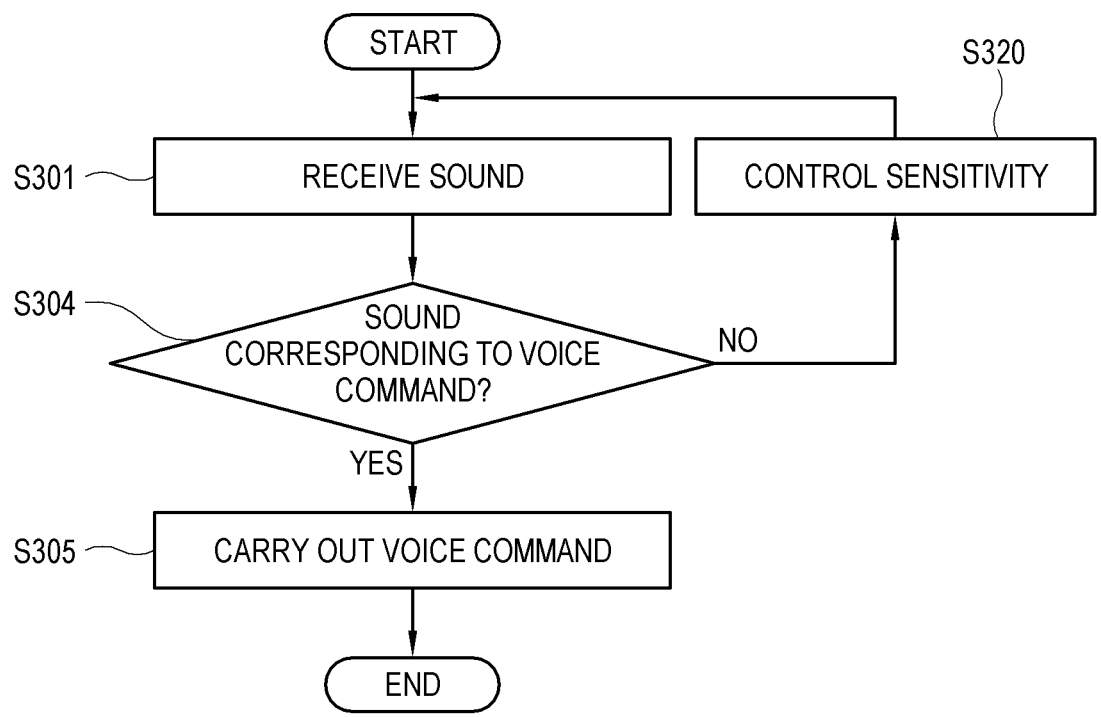
FIG. 3 is a flowchart illustrating example operations in an electronic apparatus according to an example embodiment.

FIG. 3 is a flowchart illustrating example operations in an electronic apparatus according to an example embodiment.

The electronic apparatus 1 receives a sound through the receiver 220 (S301).

The processor 210 determines whether the characteristic of the received sound corresponds to a voice command (S304). The processor 210 may use many ways to determine whether the characteristic of the received sound corresponds to a voice command. The processor 210 may use a characteristic value of the received a sound, e.g., determine whether the characteristic value of the sound is higher than or equal to a predetermined value. For example, the characteristic value of the received sound may include its intensity, a frequency, and similarity with a sample sound of a voice. However, the characteristic value of the sound is not limited to these values, and may further include another characteristic value.

When it is determined that the received sound corresponds to a voice command ('YES' in S304), the processor 210 performs an operation corresponding to the voice command (S305).

On the other hand, when it is determined that the received sound does not correspond to a voice command ('NO' in S304), the processor 210 may control or change the sensitivity (S320). When the received sound does not correspond to a voice command, it may, for example, refer to the situation in which the received sound involves high levels of much noise. Therefore, in this case, the processor 210 may raise the sensitivity and then determine again whether the received sound corresponds to a voice command. The operation S320, in which the processor 210 controls the sensitivity, will be described in greater detail below with reference to FIG. 6.

The electronic apparatus 1 according to an example embodiment properly controls the sensitivity while using the minimum and/or reduced resources based on circumstances, thereby performing an optimum and/or improved sound process. This example illustrates an example where the sensitivity is raised, but is not limited to this example. The sensitivity may be lowered based on circumstances.

The operation S304 of determining whether the received sound corresponds to a voice command may include an operation of recognizing a voice command. When filtering of the received sound is properly used before recognizing the voice command, the electronic apparatus 1 may efficiently carry out the voice command while using fewer resources.

The operation S304 of determining whether the received sound corresponds to a voice command may be implemented, for example, and without limitation, not in the electronic apparatus 1, but another apparatus. For example, the processor 210 may transmit a sound received through the receiver 220 or the communicator 250 to the external server (not shown). Further, the external server (not shown) may receive the sound and transmit a voice command corresponding to the sound to the electronic apparatus 1. Like this, receiving a sound, determining whether the received sound corresponds to a voice command, and performing the operation corresponding to the voice command may be implemented as one or more apparatuses. Regarding the operations of the electronic apparatus 1 set forth herein, the electronic apparatus 1 may perform all the operations. A server may perform some operations, or the server may receive a sound from the electronic apparatus 1 and implement all the operations.

Figure 4:
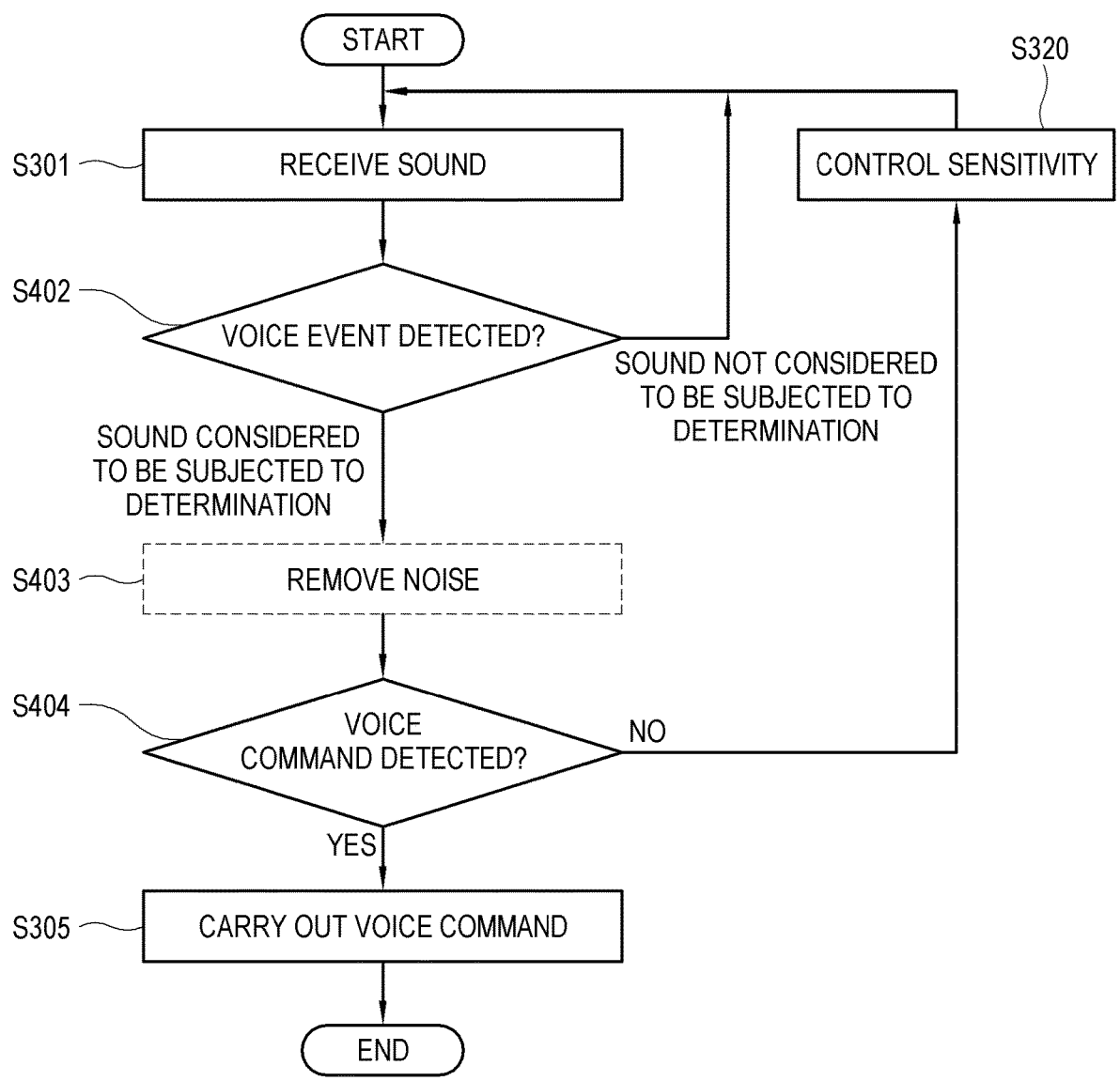
FIG. 4 is a flowchart illustrating example operations in an electronic apparatus according to an example embodiment.

FIG. 4 is a flowchart illustrating example operations in an electronic apparatus according to another example embodiment. In the electronic apparatus 1 shown in FIG. 4, repetitive descriptions will be avoided with regard to the same or similar elements to those of the electronic apparatus 1 described with reference to FIG. 3. Descriptions will not be repeated with regard to the operation S301 in which the processor 210 receives a sound, and the operation S305 in which the voice command is carried out.

When the sound is received (S301), the processor 210 determines whether a voice event is detected from the received sound (S402). The detection of the voice event is to determine whether an event corresponding to a user's voice is present in the received sound, with a given sensitivity. Like the operation S304 shown in FIG. 3, the processor 210 may use the characteristic value of the received sound in determining whether the voice event is detected. Details of detecting of the voice event will be described in greater detail below with reference to FIG. 6.

As a result of detecting the voice event, when it is determined that the voice event is not detected ('SOUND NOT CONSIDERED TO BE SUBJECTED TO DETERMINATION' in S402), the processor 210 classifies the received sound as not a sound considered to be subjected to determination, and is on standby to receive a next sound. When it is determined that the voice event is detected ('SOUND CONSIDERED TO BE SUBJECTED TO DETERMINATION' in S402), the processor 210 removes noise from the received sound (S403). The processor 210 may skip the operation S403 of removing noise and perform operation S404. The operation S403 of removing noise will be described in greater detail below with reference to FIG. 10.

The processor 210 determines whether a voice command is detected from the sound considered to be subjected to the determination (S404). Although the sound is determined as a sound considered to be subjected to the determination during the voice event detection, the sound may include only noise or may include a voice without a command. When it is determined that a voice command is not detected from the sound considered to be subjected to the determination ('NO' in S404), the processor 210 controls the sensitivity for the operation S402 of determining whether a voice event is detected (S320). The operation S320 of controlling the sensitivity will be described in greater detail below with reference to FIG. 6. When it is determined that a voice command is detected from the sound considered to be subjected to the determination ('YES' in S404), the processor 210 carries out the voice command (S305). By the operation S402 of determining whether the voice event is detected before the operation S404, it is possible to reduce the malfunction of the electronic apparatus 1 in terms of the voice recognition.

Figure 5:
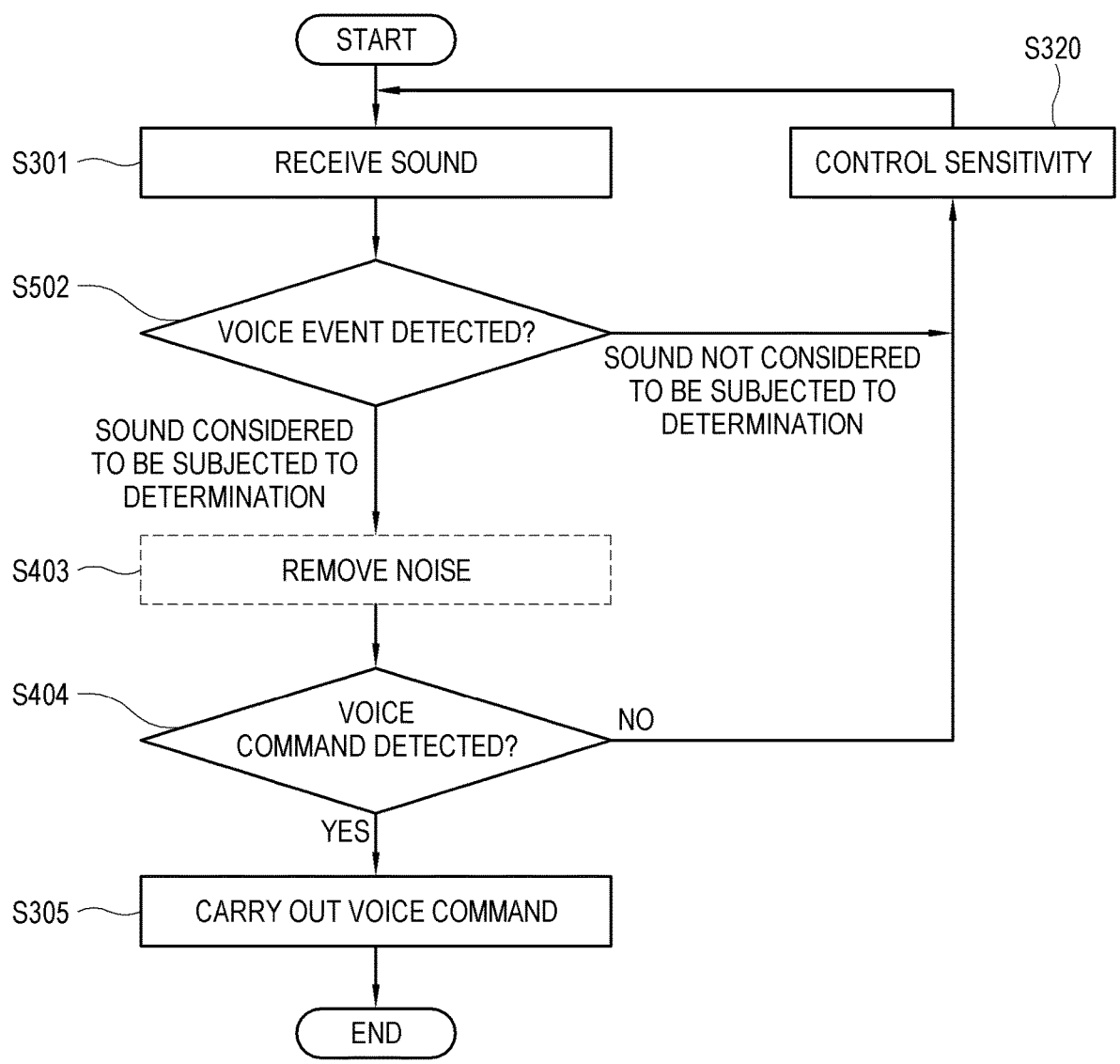
FIG. 5 is a flowchart illustrating example operations in an electronic apparatus according to an example embodiment.

FIG. 5 is a flowchart illustrating example operations in an electronic apparatus according to an example embodiment. Regarding the operations of the electronic apparatus 1 shown in FIG. 5, repetitive descriptions will be avoided with regard to the same or similar operations to those of the electronic apparatus 1 described with reference to FIGS. 3 and 4. Descriptions about the audio-signal receiving operation S301, the noise removing operation S403, the voice detecting operation S404, and the command carrying-out operation S305 will not be repeated, and an operation S502 of detecting a voice event will be described in greater detail.

When it is determined in the voice-event detecting operation S502 that the received sound is a sound considered to be subjected to determination, the processor 210 performs the same operations as the noise removing operation S403 and/or the voice command detecting operation S404. On the other hand, when it is determined that the received sound is not the sound considered to be subjected to the determination, the processor 210 performs the sensitivity control operation S320. Here, the sensitivity refers to a sensitivity by which to detect a voice event in the operation S502. When the received sound is highly likely to be classified as not the sound considered to be subjected to the determination, most of the sound received in the electronic apparatus 1 may be noise. Therefore, the processor 210 adjusts the sensitivity in accordance with the circumstances to thereby optimize and/or improve a balance of resources. Details of the sensitivity control operation S320 depending on results of the voice-event detecting operation S502 will be described in greater detail below with reference to FIG. 7.

Below, the electronic apparatus 1 according to another example embodiment will be described. The electronic apparatus 1 according to an example embodiment has a normal mode and a standby mode. The normal mode may refer, for example, to a mode in which all the elements of the electronic apparatus 1 operate normally. The standby mode may refer, for example, to a mode in which at least some elements of the electronic apparatus 1 are turned off or enter a sleep mode to thereby decrease power consumption in the electronic apparatus 1. For example, the electronic apparatus 1 in the standby mode may make the output unit 240 such as the display or the loudspeaker be disabled. Further, the electronic apparatus 1 in the standby mode may make only elements for receiving a sound, such as the processor 210 and the receiver 220, be enabled but the other elements be disabled. When there is a plurality of processors 210, only some of the processors 210 may be enabled but the others may be disabled in the standby mode. However, the elements of the electronic apparatus 1 to be turned off in the standby mode or enter the sleep mode are not limited to the foregoing example, and may vary depending on embodiments.

A sound may be received while the electronic apparatus 1 is in the standby mode. For instance, when a sound involving a voice command is received while the electronic apparatus 1 is powered off, e.g., soft-off, the processor 210 may be turned on and enters the normal mode, thereby carrying out the voice command. Thus, the electronic apparatus 1 switches over to the normal mode and operates when desired by a user, while minimizing and/or reducing power consumption. The electronic apparatus 1 may receive a sound involving no voice command of a user while being powered off. According to an example embodiment, the electronic apparatus 1 efficiently processes not a voice command embedded in a sound received in the standby mode but the sound, thereby minimizing and/or reducing a malfunction caused by the sound without the voice command and reducing wasteful power consumption.

Referring back to the flowchart of FIG. 3, descriptions will be made in greater detail. In this example embodiment, the processor 210 includes two processors (e.g., a first the first processor and a second processor). In the standby mode, the first processor and the receiver 220 normally operate, but the other elements (including the second processor) except the first processor and the receiver 220 are turned off or enter the sleep mode. Such control for turning on/off each element in the standby mode or control for the normal mode/sleep mode may be performed by the first processor, or by a separate processor. When the receiver 220 receives a sound (S301), the first processor determines whether the received sound corresponds to a voice command (S304). When the received sound does not correspond to a voice command ('NO' in S304), the first processor may control the sensitivity (S320). On the other hand, when the received sound corresponds to a voice command ('YES' in S304), the first processor controls the second processor to be turned on or enter the normal mode, and the second processor performs control to carry out the voice command of the sound (S305). Like this, when there are two or more processors, the electronic apparatus 1 in the standby mode can minimize and/or reduce power consumption since one of the processors is powered off.

In another example, there may be three or more processors 210. This example embodiment will be described in greater detail with reference to the flowchart of FIG. 4. The processor 210 in this example includes three processors (e.g., a first processor, a second processor, and a third processor). In the standby mode, the first processor (not shown) and the receiver 220 normally operate, but the other elements (including the second processor and the third processor) except the first processor and the receiver 220 are turned off or enter the sleep mode. Such control for turning on/off each element in the standby mode or control for the normal mode/sleep mode may be performed by the first processor, or by a separate processor. When the receiver 220 receives a sound (S301), the first processor determines whether a voice event is present in the received sound (S402). When the voice event is detected ('YES' in S402), the first processor controls the second processor (not shown) to be turned on or enter the normal mode, and the second processor removes noise and determines whether a voice command is detected (S404). When the voice command is detected ('YES' in S404), the second processor controls the third processor (not shown) to be turned on or enter the normal mode, and the third processor carries out a command corresponding to the sound (S305).

The foregoing descriptions of the processor 210 and the following descriptions about the processor 210 may include operations of a single or a plurality of processors.

Below, the operation S320 in which the processor 210 controls the sensitivity will be described in greater detail.

Figure 6:
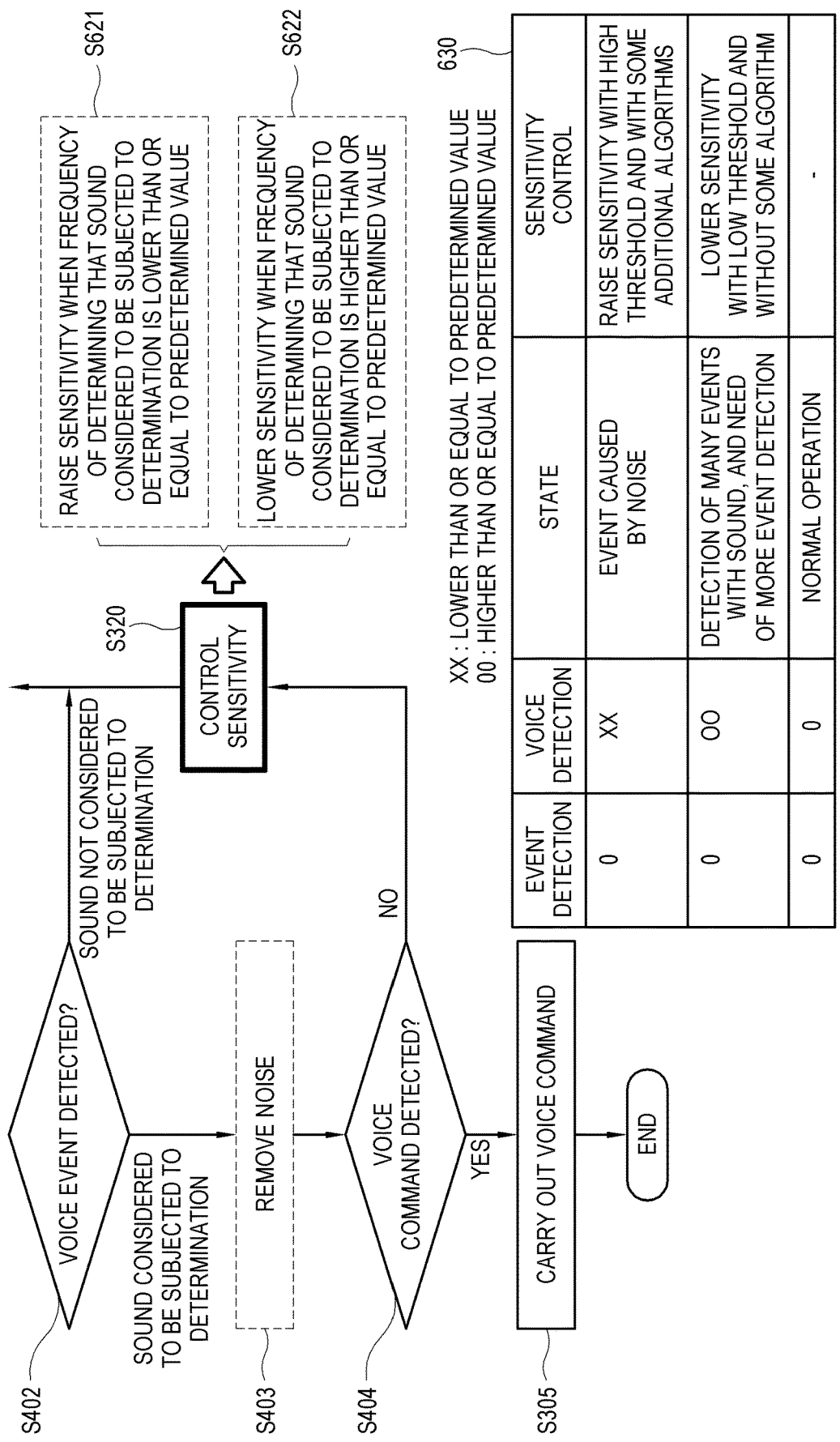
FIG. 6 is a diagram illustrating an example process of controlling sensitivity in an electronic apparatus according to an example embodiment.

FIG. 6 is a diagram illustrating an example process of controlling sensitivity in an electronic apparatus according to an example embodiment. According to an example embodiment, the processor 210 may, for example, and without limitation, control the sensitivity by adjusting a threshold value of a characteristic value of a sound, by adjusting a level of an algorithm or the number of algorithms to be used, or the like.

As an example of the threshold value, the processor 210 may classify a sound, the loudness of which is higher than or equal to a specific value, as the sound considered to be subjected to the determination. In this manner, the sound, the loudness of which is lower than the specific value may be classified as not the sound considered to be subjected to the determination. In this case, when the threshold value increases to raise the sensitivity, the sound considered to be subjected to the determination decreases but the sound not considered to be subjected to the determination increases.

On the other hand, when the threshold value decreases to lower the sensitivity, the sound considered to be subjected to the determination increases but the sound not considered to be subjected to the determination decreases. Alternatively, to raise the sensitivity, the processor 210 may, for example, and without limitation, use an algorithm of a high level, increase the number of algorithms to be used, or the like. In this case, the sound considered to be subjected to the determination decreases, whereas the sound not considered to be subjected to the determination increases. On the other hand, when the algorithm has a low level or fewer algorithms are used to lower the sensitivity, the sound considered to be subjected to the determination increases, but the sound not considered to be subjected to the determination decreases. Regarding the threshold value and the algorithm, descriptions will be made in greater detail below with reference to FIG. 11.

When the voice event is detected by high sensitivity, the throughput or calculation of the processor 210 may be more than that of low sensitivity. As the sensitivity is raised, the processor 210 uses the more resources in detecting the voice event, but precision becomes higher. Although the sensitivity is raised in detecting the voice event, a ratio between the number of times that the sound is detected as the voice event and the number of times that the sound is received may be not always linearly lowered, but it may be regarded that there is a relationship between the sensitivity and the ratio. On the other hand, when the sensitivity is lowered in detecting the voice event, it may cause the opposite result.

By controlling the sensitivity, the processor 210 may operate with high precision while accepting use of more resources, or may operate with low precision while accepting use of fewer resources. Therefore, the processor 210 controls the sensitivity to be properly adjusted in detecting the voice event so that the electronic apparatus 1 can perform an optimum and/or improved audio process to a sound of a user while using the minimum and/or reduced resources based on circumstances.

When the voice event is detected by low sensitivity, the processor 210 may classify a received sound as a sound considered to be subjected to the determination even though a user's voice is not actually present in the sound. Therefore, when such a detection error is highly likely to occur, the processor 210 raises the sensitivity so that a frequency of classification as the sound considered to be subjected to the determination can be lowered in the operation S402 of detecting the voice event. Ultimately, even though more resources are used as calculation increases in the voice-event detecting operation S402, it is possible to optimize and/or improve an overall balance in using the resources since a frequency of performing the subsequent operations (e.g. S403, etc.) is lowered.

The electronic apparatus 1 may malfunction based on circumstances even though the voice event is detected by high sensitivity. That is, the processor 210 may classify the sound involving a user's voice as not the sound considered to be subjected to the determination. Therefore, when a frequency of classification as the sound not considered to be subjected to the determination is higher than or equal to a predetermined value in the voice-event detecting operation S402, the processor 210 performs control S320 to lower the sensitivity and thus decrease the frequency of classification as the sound not considered to be subjected to the determination. In the voice-event detecting operation S402, the processor 210 may perform the control to lower the sensitivity by lowering the threshold value of the characteristic value, using the algorithm having a low level, decreasing the number of algorithms to be used, or the like method. Thus, the processor 210 lowers the frequency of controlling the classification as the sound not considered to be subjected to the determination, in the voice-event detecting operation. Further, by lowering the sensitivity, fewer resources may be used in the voice-event detecting operation. However, when the sensitivity is lowered, many signals are classified as the sound considered to be subjected to the determination, and thus the electronic apparatus 1 may need more resources while the processor 210 controls the subsequent operations (e.g. S303 to S305). Therefore, the processor 210 may properly adjust the sensitivity by considering a balance between the resources used in detecting the voice event and the resources used in the subsequent operations.

Below, the sensitivity control operation S320 of FIG. 3 will be described. The reference numeral of '630' shows an example of a table where operations of the processor 210 are tabulated corresponding to the circumstances. When the frequency of detecting no signals corresponding to the voice command ('NO' in S304) is higher than or equal to the predetermined value, the processor 210 may raise the sensitivity (S320). The foregoing circumstances may show that a voice is not detected even though a sound is received, e.g., the current circumstances where the sound received in the electronic apparatus 1 involves much noise 103. Under the circumstances where there is much noise 103, a result of 'NO' is expected when the processor 210 performs the operation S304 of detecting the sound of a voice command or the operation S404 of detecting a voice. Therefore, when the frequency of 'NO' as the result of the operation S304 (or the operation S404) is high, the operation S621 may be performed to raise the sensitivity. Thus, the processor 210 more sensitively reacts to a received sound, thereby improving precision in determining whether the sound includes the voice command or not. On the other hand, when the frequency of detecting a sound of a voice command ('YES' in S304) or detecting a voice ('YES' in S404) is higher than or equal to the predetermined value, the processor 210 may perform control S622 to lower the sensitivity. The high frequency of detecting the sound of a voice command may show a circumstance where most of the received sound is the voice command. Therefore, the processor 210 controls the sensitivity in accordance with the results from the operation S304 of detecting a sound of a voice command or the operation S404 of detecting a voice (S320), so that the electronic apparatus 1 can efficiently operate according to circumstances or a user's intention.

Below, a process (e.g., the operation S320) in which the processor 210 controls the sensitivity will be described in greater detail.

Figure 7:
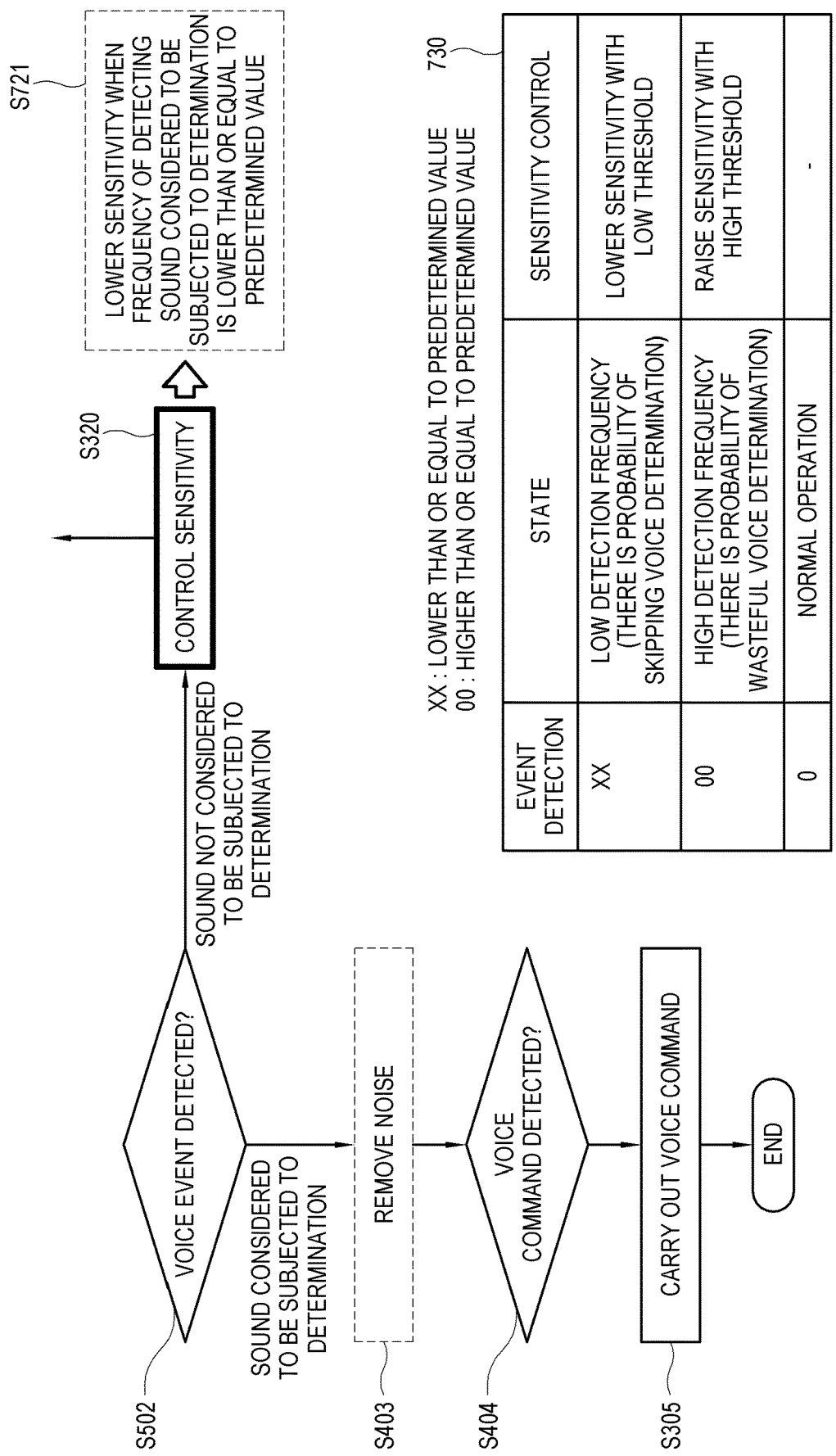
FIG. 7 is a diagram illustrating an example process of controlling sensitivity in an electronic apparatus according to an example embodiment.

FIG. 7 is a diagram illustrating an example process of controlling sensitivity in an electronic apparatus according to an example embodiment. In the processes illustrated in FIG. 7, repetitive descriptions will be avoided with regard to the same or similar processes to those illustrated in FIG. 6. The descriptions about the operations S403, S404, and S305 will not be repeated here. The reference numeral of '730' shows an example of a table where operations of the processor 210 are tabulated corresponding to the circumstances.

When the frequency of classification as the sound considered to be subjected to the determination is higher than or equal to a predetermined value in a voice-event detecting operation S502, the processor 210 may perform control S320 to raise the sensitivity. The foregoing circumstance may show a circumstance where the sound involving no voices is excessively classified as the sound considered to be subjected to the determination. When the sound involving no voices is excessively classified as the sound considered to be subjected to the determination, there is a possibility that the resources of the electronic apparatus 1 are wasted in determining the sound involving no voices. Therefore, when a frequency of classification as the sound considered to be subjected to the determination is higher than or equal to a predetermined value in the voice-event detecting operation S502, the processor 210 may raise the sensitivity. Thus, the processor 210 more sensitively reacts to a received sound, thereby lowers a frequency of classifying the sound including no voices as the sound considered to be subjected to the determination. On the other hand, when the frequency of classification as the sound considered to be subjected to the determination is lower than the predetermined value in the voice-event detecting operation S502, the processor 210 may perform control S721 to lower the sensitivity. The foregoing circumstance may show a circumstance where the sound received with a voice is excessively classified as not the sound considered to be subjected to the determination. When the sound received with a voice is excessively classified as not the sound considered to be subjected to the determination, it may be inconvenient for a user to use the electronic apparatus 1 since s/he has to make a speech several or more times for the voice recognition. Therefore, when the frequency of the classification as the sound considered to be subjected to the determination is lower than or equal to a predetermined value in the voice-event detecting operation S502, the processor 210 may perform the control S721 to lower the sensitivity. Thus, the processor 210 less sensitively reacts to a received voice, thereby increasing the frequency of classifying the sound involving the voice as the sound considered to be subjected to the determination. In accordance with whether the frequency of the classification as the sound considered to be subjected to the determination is higher than or equal to or lower than the predetermined value, the processor 210 may raise or lower the sensitivity in the voice-event detecting operation S502 (S320). However, there are no limits to the present disclosure. Thus, the processor 210 controls the sensitivity in accordance with the circumstances to thereby optimize and/or improve the balance in the resources.

Figure 8:
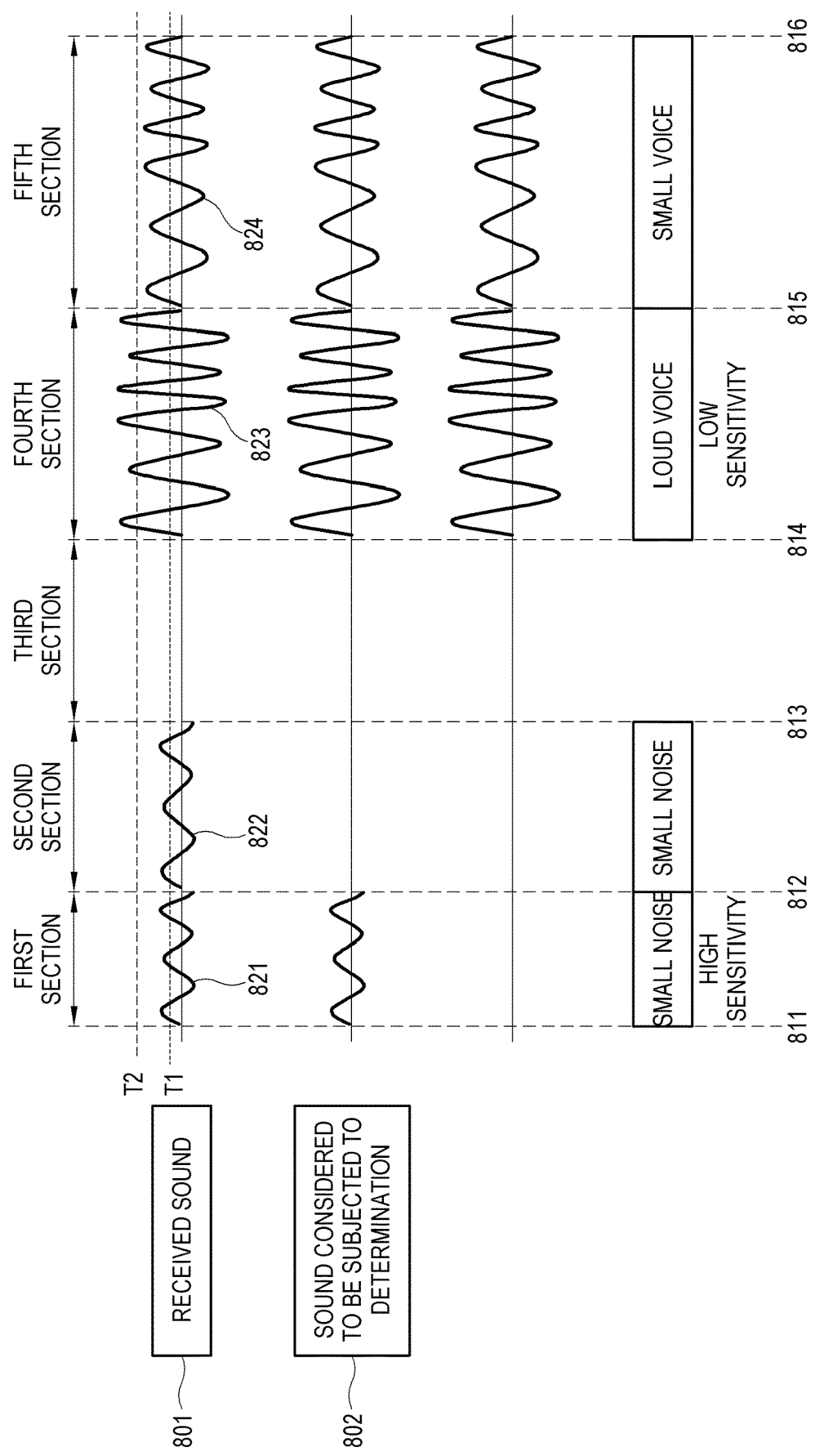
FIG. 8 is a diagram illustrating an example process of controlling sensitivity in an electronic apparatus according to an example embodiment.

FIG. 8 is a diagram illustrating an example process of controlling sensitivity in an electronic apparatus according to an example embodiment.

In FIG. 8, the graph shows that a sound 801 received in the electronic apparatus 1 and a sound 802 detected in the received sound. The dotted lines 811, 812, 813, 814, 185, 816 indicate points in time on the graph. A first section indicates a section between points in time 811 and 812. In this manner, the second to fifth sections are also defined like the first section. 'T1' and 'T2' indicate threshold values, and 'T2' is higher than 'T1'. The threshold value is initially set to 'T1' in the first section. The loudness of a sound 821 received in the first section is higher than 'T1' but lower than 'T2'. A sound 822 received in the second section is the same as that received in the first section. The loudness of a sound 823 in the fourth section is higher than 'T2'. The loudness of a sound 824 received in the fifth section is lower than 'T2' but higher than 'T1'. For convenience of description, FIG. 8 illustrates that the sensitivity is controlled based on the threshold value of the loudness. The threshold value of the loudness is not always used. Alternatively, another algorithm may be used to control the sensitivity.

The sound 801 received in the first section shows presence of noise having a low loudness level. The sound 801 in the first section is higher than the initial threshold value T1, and therefore classified as the sound considered to be subjected to the determination. When the noise having a low loudness level is detected in the voice-event detecting operation S402 and classified as the sound considered to be subjected to the determination, the processor 210 determines whether a voice is detected (S404) Since the sound is a small noise, the processor 210 does not determine the sound as a voice. When a frequency of the same result as that in the first section is higher than or equal to a predetermined value, the processor 210 may determine most of the received sound as noise, and raise the sensitivity. For example, the processor 210 may raise the sensitivity by increasing the threshold value from 'T1' to 'T2'. In the state that the sensitivity is raised with the threshold value of 'T2', the processor 210 does not classify the sound of the second section as the sound considered to be subjected to the determination even though the sound having a loud noise 822 is received in the second section. Like this, when the frequency of detecting no voices from the sound considered to be subjected to the determination is higher than or equal to the predetermined value, the processor 210 raises the sensitivity so that the frequency of classification as the sound considered to be subjected to the determination can be decreased, thereby efficiently using the resources of the electronic apparatus 1.

In the third section, no sounds are received. When the same results as that of the third section are continued, the processor 210 may control the sensitivity in accordance with the circumstances. Then, the electronic apparatus 1 receives a sound 823 involving a loud voice in the fourth section. Because the sound 823 is a voice higher than the threshold value of 'T2', the processor 210 classifies the sound 823 as the sound considered to be subjected to the determination and detects the voice. When the frequency of the same result as that of the fourth section is higher than or equal to a predetermined value, the processor 210 determines most of the received sound as the voice, and lowers the sensitivity. For example, the processor 210 lowers the sensitivity by decreasing the threshold value from 'T2' to 'T1'. In the state that the sensitivity is lowered, the electronic apparatus 1 receives the sound 824 involving the voice having a low loudness level in the fifth section. Because the sound received in the fifth section has a loudness level lower than that of the sound received in the second section, the processor 210 will classify the sound in the fifth section as not the sound considered to be subjected to the determination under the condition that the sensitivity is not lowered. However, the frequency of the same result as that of the fourth section is higher than or equal to the predetermined value and therefore the sensitivity is lowered, so that the processor 210 can classify a sound as the sound considered to be subjected to the determination even though the sound has a low loudness level. Like this, the processor 210 controls the sensitivity (S320) in response to whether the voice is detected or not (S404), thereby detecting a speech according to circumstances and a user's intention.

Figure 9:
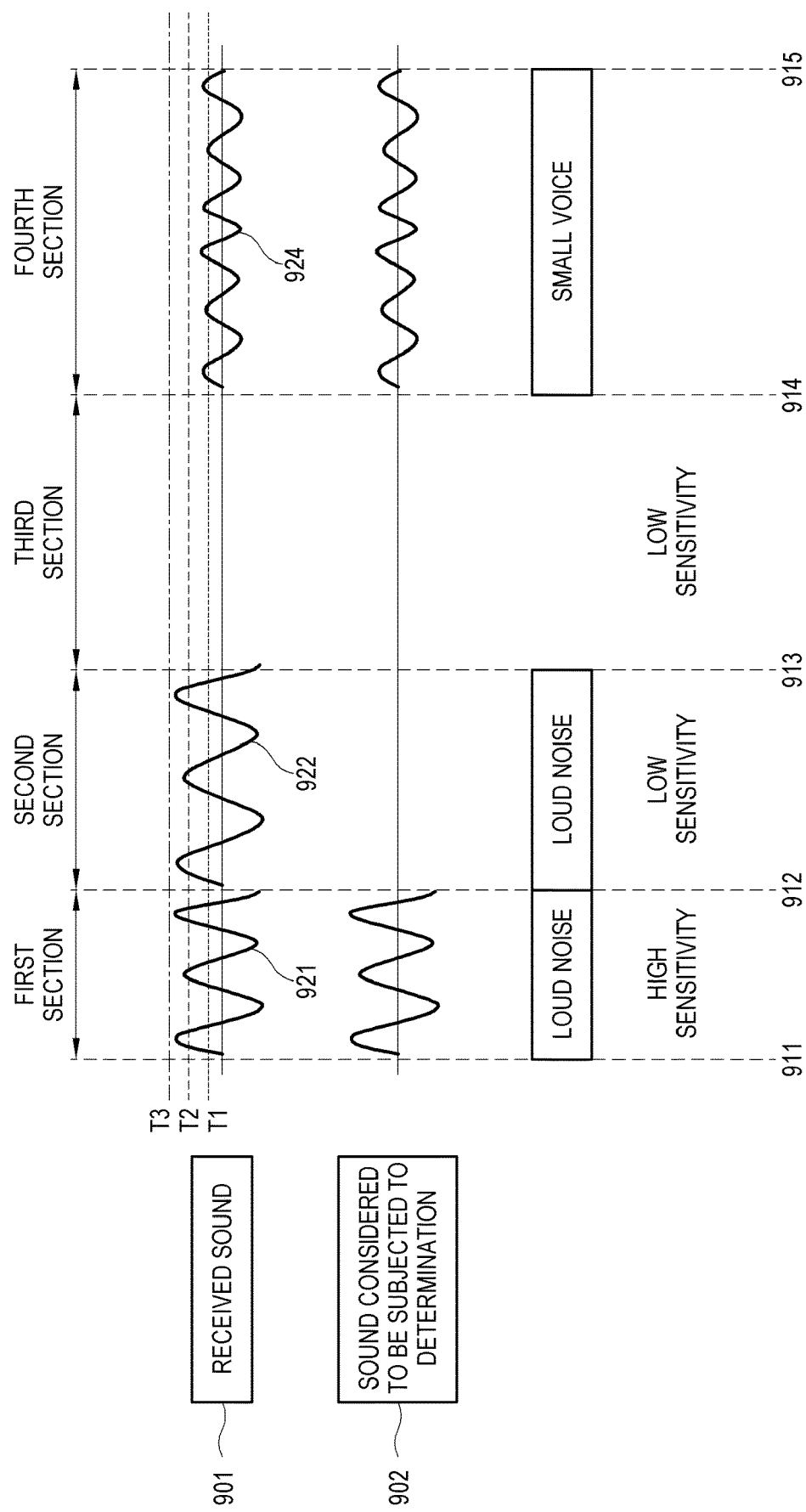
FIG. 9 is a diagram illustrating an example process of controlling sensitivity in an electronic apparatus according to an example embodiment.

FIG. 9 is a diagram illustrating an example process of controlling sensitivity in an electronic apparatus according to an example embodiment.

In the graph of FIG. 9, repetitive descriptions will be avoided with regard to the same or similar configurations as those of the electronic apparatus 1 described in FIG. 8. Descriptions about the first to fourth sections, the dotted lines 911 912, 913, 914, 915, and the received sound 901 will not be repeated.

The processor 210 determines whether a voice event is detected or not in the received sound (S502). In the sound 901, a signal detected as the sound considered to be subjected to the determination in the voice-event detecting operation S502 is indicated by the reference numeral of '902'. A loud noise is received in the first section and the second section, no sounds are received in the third section, and a small noise is received in the fourth section. T1, T2 and T3 indicate threshold values, and the threshold values are high in order of T3, T2, T1. The threshold value initially set to 'T2' in the first section.

The loudness of a sound 921 received in the first section is higher than 'T2' but lower than 'T3'. A sound 922 received in the second section has the same loudness as that of the sound 921 received in the first section. Loudness of a sound 924 received in the fourth section is higher than 'T1' but lower than 'T2'.

The processor 210 classifies the sound 921 corresponding to the noise in the first section as the sound considered to be subjected to the determination because the sound 921 is higher than the initial threshold value T2. When a frequency of classifying the sound 921 in the first section as the sound considered to be subjected to the determination is high, it is a waste of resources to perform the subsequent operations. To lower the frequency, the processor 210 may raise the sensitivity in the voice-event detecting operation S502 by changing the threshold value from 'T2' to 'T3'. In the second section, a sound 922 corresponding to noise is received. The processor 210 determines whether a voice event is detected from the sound received in the second section (S502). When the result of the first section does not raise the sensitivity, the processor 210 may classify the sound received in the second section and corresponding to the noise as the sound considered to be subjected to the determination. However, the sensitivity is raised in the second section by changing the threshold value from 'T2' to 'T3', and therefore the processor 210 classifies the sound 922 corresponding to the noise as not the sound considered to be subjected to the determination. Thus, the electronic apparatus 1 recognizes a voice command in accordance with circumstances or a user's intention. On the other hand, when a frequency of classifying the received sound as not the sound considered to be subjected to the determination is higher than or equal to a predetermined value, a user's voice command may be not normally recognized. Therefore, when the frequency of classifying the sound as not the sound considered to be subjected to the determination is higher than or equal to the predetermined value, the processor 210 may perform the control S721 to lower the sensitivity. Thus, the processor 210 less sensitively reacts to a received voice, and lowers the frequency of classifying the sound as not the sound considered to be subjected to the determination. In the third section, no sounds are received. When the same result as that of the third section is continued, the processor 210 may control the sensitivity in accordance with the circumstances. Therefore, the processor 210 may perform the control S721 to make the sensitivity be further lowered than the sensitivity lowered in the second section. Therefore, the processor 210 lowers the sensitivity by changing the threshold value from 'T2' to 'T1'. Then, the processor 210 receives a sound with the sensitivity lowered in the fourth section. Since the sensitivity is lowered, the processor 210 can classify even a small sound as the sound considered to be subjected to the determination. Therefore, the sound 924 in the fourth section is classified as the sound considered to be subjected to the determination. Like this, the processor 210 controls the sensitivity (S320) in accordance with whether a voice event is detected (S502), thereby detecting a speech according to circumstances and a user's intention.

Figure 10:
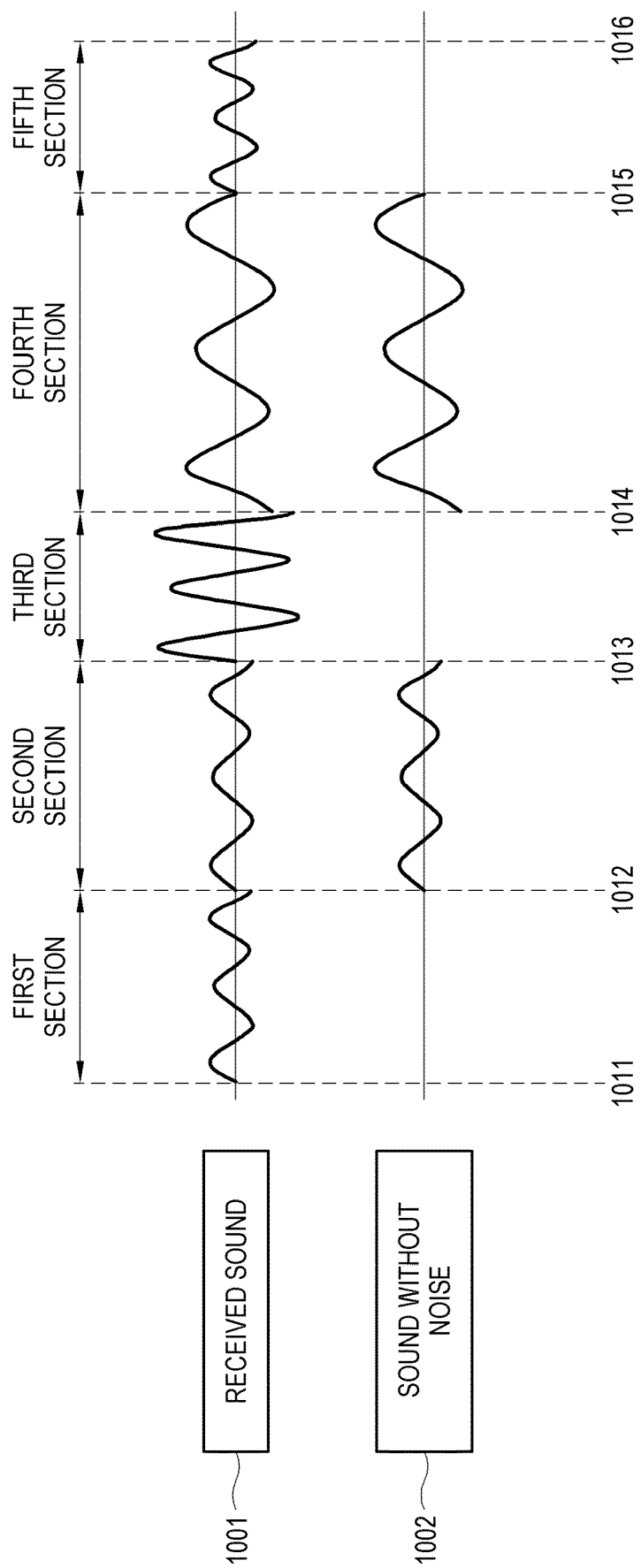
FIG. 10 is a diagram illustrating a process of controlling sensitivity in an electronic apparatus according to an example embodiment.

FIG. 10 is a diagram illustrating an example process of controlling sensitivity in an electronic apparatus according to an example embodiment.

In the graph of FIG. 10, repetitive descriptions will be avoided with regard to the same or similar configurations as those of the electronic apparatus 1 described in FIG. 8 and FIG. 9. Descriptions about the first to fourth sections, the dotted lines 1011, 1012, 1013, 1014, 1015, 1016, and the received sound 1001 will not be repeated.

The processor 210 may perform an additional operation of removing noise from the received sound (S403). The reference numeral of '1002' indicates a sound obtained by removing noise from the received sound. Only the noise is present in the first, third and the fifth sections, no noises are present in the second section, and a voice and a noise are all present in the fourth section. The operation of removing the noise may be performed to improve efficiency of detecting a voice. The voice-event detecting operation S402 may be performed after the noise removing operation S403. On the other hand, the noise removing operation S403 may be performed after the voice-event detecting operation S402. Thus, the electronic apparatus 1 enhances precision for the voice recognition.

Figure 11:
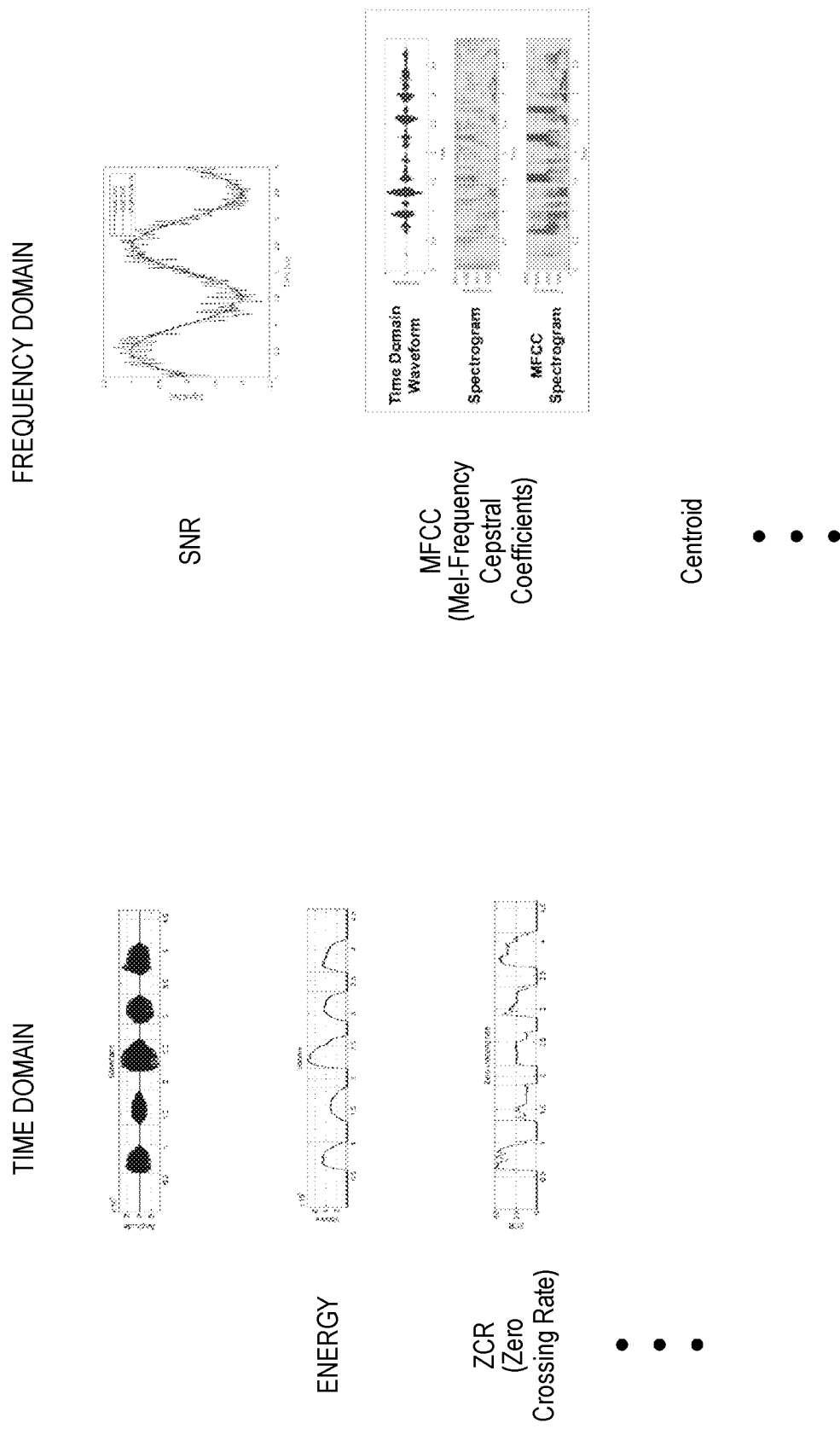
FIG. 11 is a diagram illustrating example operations of an electronic apparatus according to an example embodiment.

FIG. 11 is a diagram illustrating example operations of an electronic apparatus according to an example embodiment. In addition to the descriptions of FIG. 4, FIG. 11 illustrates the threshold value and the algorithm to be used when the processor 210 determines whether the received sound corresponds to a voice command (S304) or whether the voice event is detected (S402, S802). The processor 210 may control the sensitivity by changing the threshold value of the characteristic value in the sound or changing the algorithm to be used. The characteristic values of the sound may include, for example, and without limitation, the loudness of the sound, a point in time at which the sound is received, a period of time during which the sound is received, or the like, without limitations. For example, in a case of the loudness of the sound, the processor 210 may set a threshold value of '5' for the loudness of the sound. In this case, when the sound has a loudness level of '3', the processor 210 may classify this sound as not the sound considered to be subjected to the determination. When the processor 210 lowers the sensitivity by setting the threshold value to '2' and the received sound has a loudness level of '3', the sound may be classified as the sound considered to be subjected to the determination. The loudness is merely an example, and the processor 210 may control the sensitivity (S320) by another characteristic value. The processor 210 may control the sensitivity (S320) by the algorithm. There are many algorithms available in detecting a voice event.

By way of example, FIG. 11 illustrates algorithms related to a time domain and a frequency domain. However, the algorithm available in this example embodiment is not limited to only the algorithms related to the time domain and the frequency domain. In general, the time-domain algorithm is relatively simple and uses fewer resource, but has low precision in voice recognition. On the other hand, the frequency-domain algorithm is relatively complicated and uses more resources, but has high precision in voice recognition. Therefore, the processor 210 may use an algorithm suitable for circumstances and a user's intention to thereby enhance efficiency in the voice recognition. For example, the processor 210 may use only the time-domain algorithm to lower the sensitivity. Therefore, the processor 210 may check a relatively simple characteristic value and determine the voice event (S402 or the operation S802). On the other hand, the processor 210 may add a time-domain algorithm or may replace the time-domain algorithm by the frequency-domain algorithm or additionally use the frequency-domain algorithm to raise the sensitivity. The processor 210 may determine the voice event (S402 or the operation S802) with relatively high precision through relatively complicated calculation. In the time-domain algorithm, energy, a zero-crossing rate, or the like, may be used. In the frequency-domain algorithm, a signal-to-noise ratio, a mel-Frequency cepstral coefficient, a centroid, or the like, may be used. However, this example embodiment is not limited to the above algorithms, and another algorithm may be available. Thus, the electronic apparatus 1 can optimize the balance of the resources by properly using the algorithms according to the circumstances.

Figure 12:
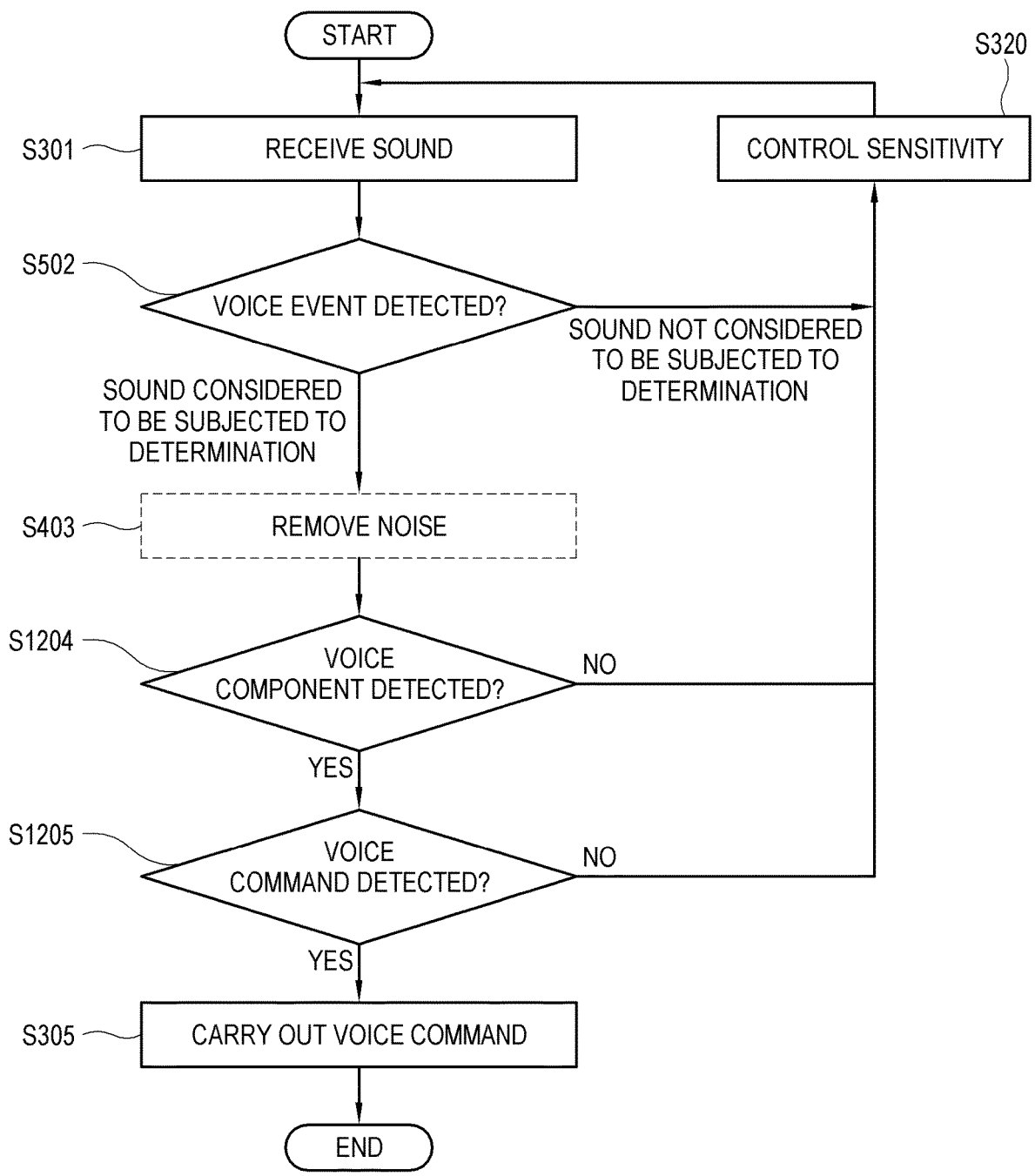
FIG. 12 is a flowchart illustrating example operations in an electronic apparatus according to an example embodiment.

FIG. 12 is a flowchart illustrating example operations in an electronic apparatus according to an example embodiment. In the operations of the electronic apparatus 1 shown in FIG. 12, repetitive descriptions will be avoided with regard to the same or similar configurations of the electronic apparatus 1 described with reference to FIG. 3, 4 and FIG. 8. Descriptions about the audio-signal receiving operation S301, the command carrying-output operation S305, the noise-removing operation S403, and the voice-event detecting operation S802 are not repeated, but descriptions about a voice-component detecting operation S1204 and a voice-command detecting operation S1205 will be made in greater detail below.

The voice-component detecting operation S1204 and the voice-command detecting operation S1205 may be sub-operations of the voice detecting operation S404. When the received sound is classified as the sound considered to be subjected to the determination in the voice-event detecting operation (S802), the processor 210 determines whether a voice component is detected from the sound considered to be subjected to the determination. When the voice component is not detected from the sound considered to be subjected to the determination ('NO' in S1204), the processor 210 may control the sensitivity for the voice-event detecting operation S802. On the other hand, when the voice component is detected from the sound considered to be subjected to the determination ('YES' in S1204), the processor 210 determines whether a voice command is detected (S1205). When the voice command is not detected from the sound considered to be subjected to the determination ('NO' in S1205), the processor 210 may control the sensitivity for the voice-event detecting operation S802. On the other hand, when the voice command is detected from the sound considered to be subjected to the determination the voice command ('YES' in S1205), the processor 210 carries out a command corresponding to the voice command (S305). Among the foregoing operations, descriptions about the operation S320 where the processor 210 controls the sensitivity will be made in greater detail below with reference to FIG. 13.

Figure 13:
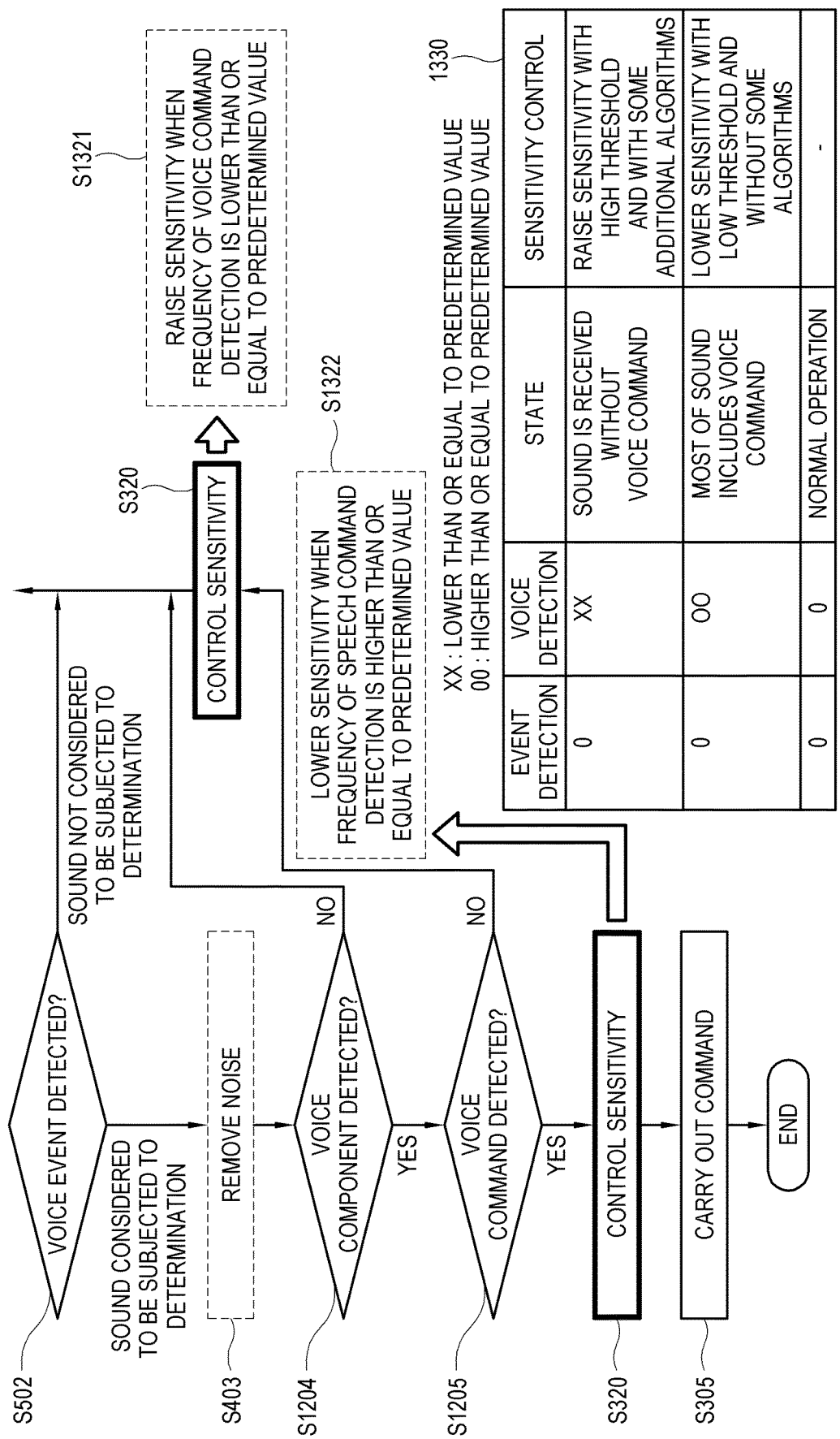
FIG. 13 is a diagram illustrating an example process of controlling sensitivity in an electronic apparatus according to an example embodiment.

FIG. 13 is a diagram illustrating an example process of controlling sensitivity in an electronic apparatus according to an example embodiment. In the operations shown in FIG. 13, repetitive descriptions will be avoided with regard to the same or similar operations as those described with reference to FIGS. 5 and 9. Descriptions about the voice-event detecting operation S802, the noise-removing operation S403, and the command carrying-out operation S305 will not be repeated.

Reference numeral of '1330' shows an example of a table where operations of the processor 210 are tabulated corresponding to the circumstances.

The processor 210 determines whether the voice component is detected from the sound considered to be subjected to the determination (S1204). When it is determined that the voice component is present in the sound ('YES' in S1204), the processor 210 determines whether the voice command is detected (S1205).

On the other hand, when the voice component is not detected from the sound considered to be subjected to the determination ('NO' in S1204), the processor 210 may control (adjust) the sensitivity (S320). Although FIG. 13 does not illustrate that the processor 210 controls the sensitivity as no voice components are detected, detailed descriptions thereof will be avoided since this operation is replaceable by the operation shown in FIG. 5 where the processor 210 controls the sensitivity as the voice component is not detected ('NO' in S404). On the other hand, when the voice component is detected from the sound considered to be subjected to the determination ('YES' in S1204), the processor 210 determines whether a voice command is detected (S1205). When the voice command is detected ('YES' in S1205), the processor 210 carries out an operation corresponding to the voice command (S305). Further, the processor 210 may additionally control the sensitivity in accordance with the circumstances (S320). When a frequency of detecting the voice command is higher than or equal to a predetermined value, most of the sound may be the voice command. Further, when the frequency of detecting the voice is high in the voice detecting operation S404, and there is classification as not the sound considered to be subjected to the determination, the processor 210 may additionally control the sensitivity S320 in accordance with the circumstances. Therefore, the processor 210 may increase the frequency of classifying the sound as the sound considered to be subjected to the determination. Thus, the processor 210 lowers the sensitivity in the voice-event detecting operation S802 (S1322), thereby increasing the frequency of classification as the sound considered to be subjected to the determination in the voice-event detecting operation S802 and increasing the frequency of detecting the voice command. On the other hand, when the voice command is not detected ('NO' in S1205), the processor 210 is on standby to receive the next sound. The processor 210 may additionally control the sensitivity (S320). When the frequency of detecting no voice commands ('NO' in S1205) is higher than or equal to a predetermined value, the processor 210 raises the sensitivity in the voice-event detecting operation S802 (S1321), thereby decreasing the frequency of classification as the sound considered to be subjected to the determination in the voice-event detecting operation S802. Thus, the electronic apparatus 1 may perform the optimum audio process to a user's sound while using the minimum resources suitable for the circumstances.

Figure 14:
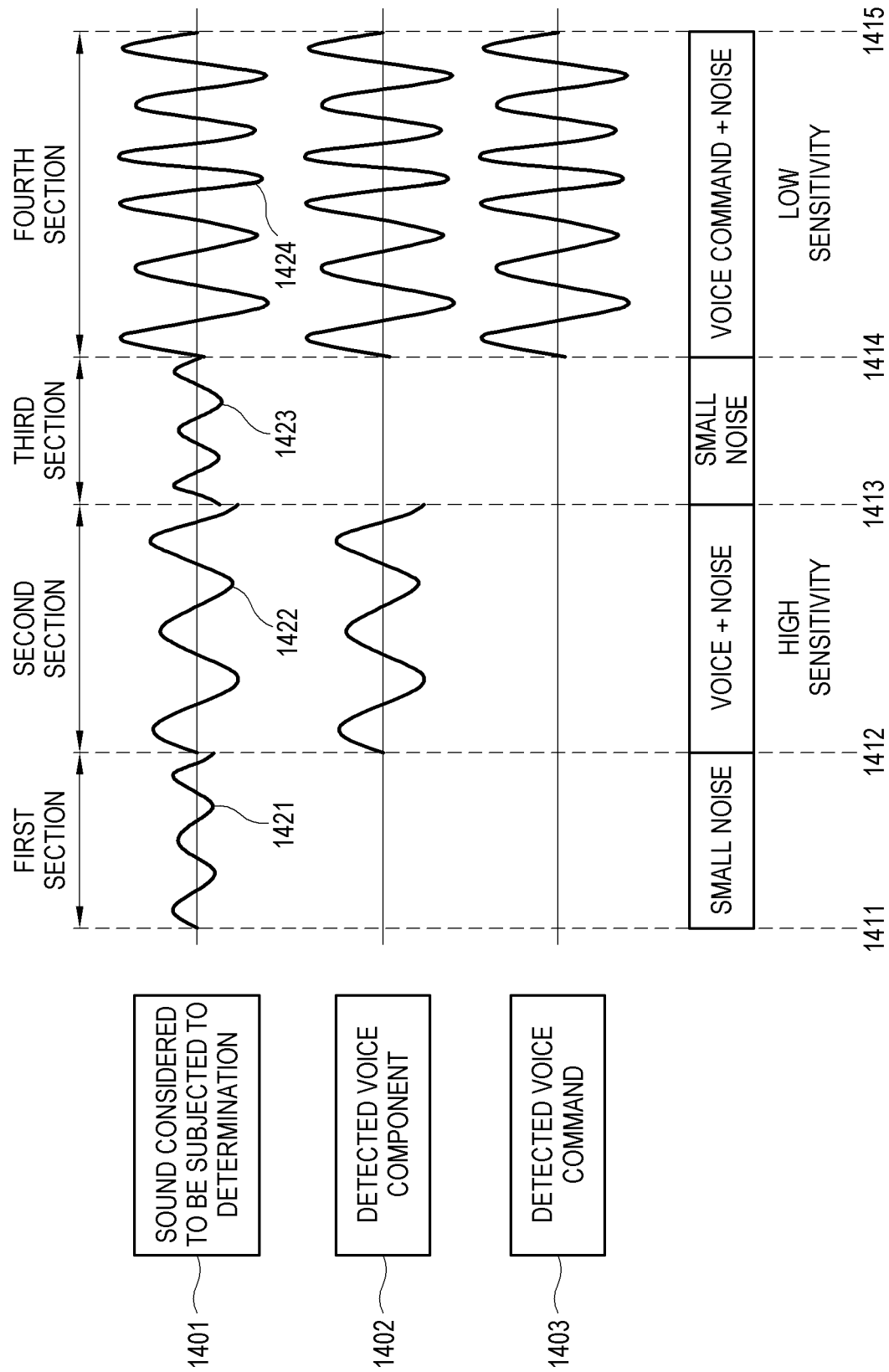
FIG. 14 is a diagram illustrating example operations of an electronic apparatus according to an example embodiment.

FIG. 14 is a diagram illustrating example operations of an electronic apparatus according to an example embodiment.

In the graph of FIG. 14, repetitive descriptions will be avoided with regard to the same or similar configurations as those of the electronic apparatus 1 described with reference to FIGS. 6, 7 and 10.

Descriptions about the first to fourth sections and the dotted lines 1411, 1412, 1413, 1414, 1415 will not be repeated.

The reference numeral of '1401' indicates a signal from the received sound, which is classified by the processor 210 as the sound considered to be subjected to the determination. The reference numeral of '1402' indicates a signal from the signal 1401 needed to be subjected to the determination, from which a voice component is detected. The reference numeral of '1403' indicates a signal from the signal 1402 involving the detected voice component, in which a voice command is detected. In the first section and the third section, a small noise 1421, 1423, respectively, is received. In the second section, a voice component and a noise 1422 are received. In the fourth section, a voice command and a noise 1424 are received.

The processor 210 determines whether a voice component is detected from the sound considered to be subjected to the determination in the first section (S1204). Because only the noise 1421 is received in the first section, no voice components are detected. Then, the processor 210 determines whether the voice component is detected from the sound 1422 considered to be subjected to the determination in the second section (S1204). Because both the voice and the noise 1422 are received in the second section, the processor 210 determines that the voice component is detected. Subsequently, the processor 210 determines whether the voice command is detected (S1205). Because the voice command is not received in the second section, the processor 210 determines that no voice commands are detected ('NO' in S1205). When the frequency of detecting no voice commands is high, it is a waste of resources to perform the subsequent operations. Therefore, to decreases this frequency, the processor 210 may raise the sensitivity in the voice-event detecting operation S802 (S1321). Only the small noise 1423 is received in the third section. Since the sensitivity is raised in the second section, the processor 210 classifies the sound in the third section 1423 as not the sound considered to be subjected to the determination. Then, because the voice command and the noise 1424 are received in the fourth section, the processor 210 determines that the voice component is detected ('YES' in S1204) and the voice command is detected ('YES' in S1205). When the frequency of detecting the voice command ('YES' in S1205) is high, the classification as not the sound considered to be subjected to the determination may be caused by the high sensitivity of the processor 210. Therefore, the processor 210 lowers the sensitivity in the voice-event detecting operation S802 (S1322), and decreases the frequency that the electronic apparatus 1 does not recognize a user's voice command. Thus, the electronic apparatus 1 can apply the optimum and/or improved audio process to a user's sound while using the minimum resources suitable for the circumstances.

As described above, according to an example embodiment, it is possible to reduce noise-based event detection in terms of voice recognition.

Further, according to an example embodiment, it is possible to reduce event detection caused by a voice involving no voice commands.

In addition, according to an example embodiment, resources of an electronic apparatus are efficiently used.

Although various example embodiments have been illustrated and described, it will be appreciated by those skilled in the art that changes may be made in these example embodiments without departing from the principles and spirit of the disclosure, the scope of which is defined, for example, in the appended claims and their equivalents.

What is claimed is:

1. An electronic apparatus comprising:
a receiver comprising receiving circuitry configured to receive a sound; and
a processor configured to:
identify with at least one algorithm from among a plurality of algorithms whether the received sound corresponds to a voice event for performing a function corresponding to a voice recognition to identify a voice command in the received sound,
based on identification that the received sound corresponds to the voice event, perform the function corresponding to the voice recognition,
based on the voice command in the received sound being not recognized, increase a number of the plurality of algorithms, and
based on the voice event being not identified, decrease the number of the plurality of algorithms.

2. The electronic apparatus according to claim 1, wherein the processor is configured to identify that the received sound corresponds to the voice event based on a characteristic value of the received sound being higher than a threshold value.

3. The electronic apparatus according to claim 2, wherein the processor is configured to remove noise from the received sound.

4. The electronic apparatus according to claim 2, wherein the processor is configured to:
based on the voice command in the sound being not recognized, increase the threshold value, and
based on the voice event being not identified, decrease the threshold value.

5. The electronic apparatus according to claim 1, wherein the processor is configured to decrease the number of the plurality of algorithms based on a frequency of that the voice event is not identified being greater than a predetermined value.

6. The electronic apparatus according to claim 1, wherein each of the plurality of algorithms, has a different precision, in identifying whether the received sound corresponds to the voice event.

7. The electronic apparatus according to claim 1, wherein the plurality of algorithms comprises at least one of: a time-domain detection algorithm and a frequency-domain detection algorithm.

8. The electronic apparatus according to claim 1, wherein the processor is configured to increase the number of the plurality of algorithms based on a frequency of identifying that the voice command in the received sound is not recognized being greater than a predetermined value.

9. A method of controlling an electronic apparatus, the method comprising:
receiving a sound;
identifying with at least one algorithm from among a plurality of algorithms whether the received sound corresponds to a voice event for performing a function corresponding to a voice recognition to identify a voice command in the received sound;
based on identification that the received sound corresponds to the voice event, performing the function corresponding to the voice recognition, and
based on the voice command in the received sound being not recognized, increasing a number of the plurality of algorithms, and
based on the voice event being not identified, decreasing the number of the plurality of algorithms.

10. The method according to claim 9, further comprising identifying that the received sound corresponds to the voice event based on a characteristic value of the received sound being higher than a threshold value.

11. The method according to claim 10, further comprising removing noise from the received sound.

12. The method according to claim 10, further comprising:

based on the voice command in the sound being not recognized, increasing the threshold value, and based on the voice event being not identified, decreasing the threshold value.

13. The method according to claim 9, wherein the decreasing the number of the plurality of algorithms comprises decreasing the number of the plurality of algorithms based on a frequency of that the voice event is not identified being greater than a predetermined value.

14. The method according to claim 9, wherein:

each of the plurality of algorithms has a different precision in identifying whether the received sound corresponds to the voice event.

15. The method according to claim 9, wherein the plurality of algorithms comprises at least one of: a time-domain detection algorithm and a frequency-domain detection algorithm.

16. The method according to claim 9, wherein the increasing the number of the plurality of algorithms comprises increasing the number of the plurality of algorithms based on a frequency of identifying that the voice command in the received sound is not recognized being greater than a predetermined value.

17. A computer program product comprising:

a memory configured to store at least one instruction which, when executed by a processor, is configured to cause an electronic device to:

receive a sound through a receiver;

identify with at least one algorithm from among a plurality of algorithms whether the received sound corresponds to a voice event for performing a function corresponding to a voice recognition to identify a voice command in the received sound, based on identification that the received sound corresponds to the voice event, perform the function corresponding to the voice recognition, based on the voice command in the received sound being not recognized, increase a number of the plurality of algorithms, based on the voice event being not identified, decrease the number of the plurality of algorithms.

* * * * *